United States Patent [19]
Itoh et al.

[11] Patent Number: 6,094,542
[45] Date of Patent: Jul. 25, 2000

[54] CAMERA USING CARTRIDGE WHICH CAN BE REPLACED IN THE COURSE OF USAGE

[75] Inventors: Junichi Itoh, Hachioji; Yuji Imai, Higashiyamato; Yasuo Tambara, Hino, all of Japan

[73] Assignee: Olympus Optical Co., Ltd., Tokyo, Japan

[21] Appl. No.: 09/263,164

[22] Filed: Mar. 5, 1999

[30] Foreign Application Priority Data

Mar. 9, 1998 [JP] Japan .................................. 10-056455

[51] Int. Cl.⁷ .................................................. G03B 17/24
[52] U.S. Cl. ............................................................ 396/319
[58] Field of Search .............................................. 396/319

[56] References Cited

U.S. PATENT DOCUMENTS 5,787,315   7/1998   Tanaka et al. ........................... 396/319

FOREIGN PATENT DOCUMENTS

| 7-191398 | 7/1995 | Japan . |
| 8-201907 | 8/1996 | Japan . |
| 9-211662 | 8/1997 | Japan . |
| 9-211690 | 8/1997 | Japan . |
| 9-230477 | 9/1997 | Japan . |
| 9-269541 | 10/1997 | Japan . |

*Primary Examiner*—Howard B. Blankenship
*Attorney, Agent, or Firm*—Frishauf, Holtz, Goodman, Langer & Chick, P.C.

[57] ABSTRACT

A camera of this invention detects the presence or absence of magnetic data and prevents at least occurrence of a frame of double exposure or unexposed frame even under the influence of an electromagnetic noise. The position of a perforation of a film is detected by a position detecting section and whether a magnetic head is set in contact with a recording area adjacent to an exposed frame or a recording inhibition area adjacent to a portion between the adjacent exposed frames is determined. A threshold value used for determining the presence or absence of magnetic data is set in a threshold setting circuit based on an output generated when the position detecting circuit determines that the magnetic head is set in contact with the recording inhibition area. An output of the magnetic head is compared with the threshold value by a determination circuit and the presence or absence of magnetic data in the recording area is determined when the position detecting circuit determines that the magnetic head is set in contact with the recording area. Whether the operation of the magnetic head is permitted or inhibited is determined based on an output of the determination circuit.

14 Claims, 21 Drawing Sheets

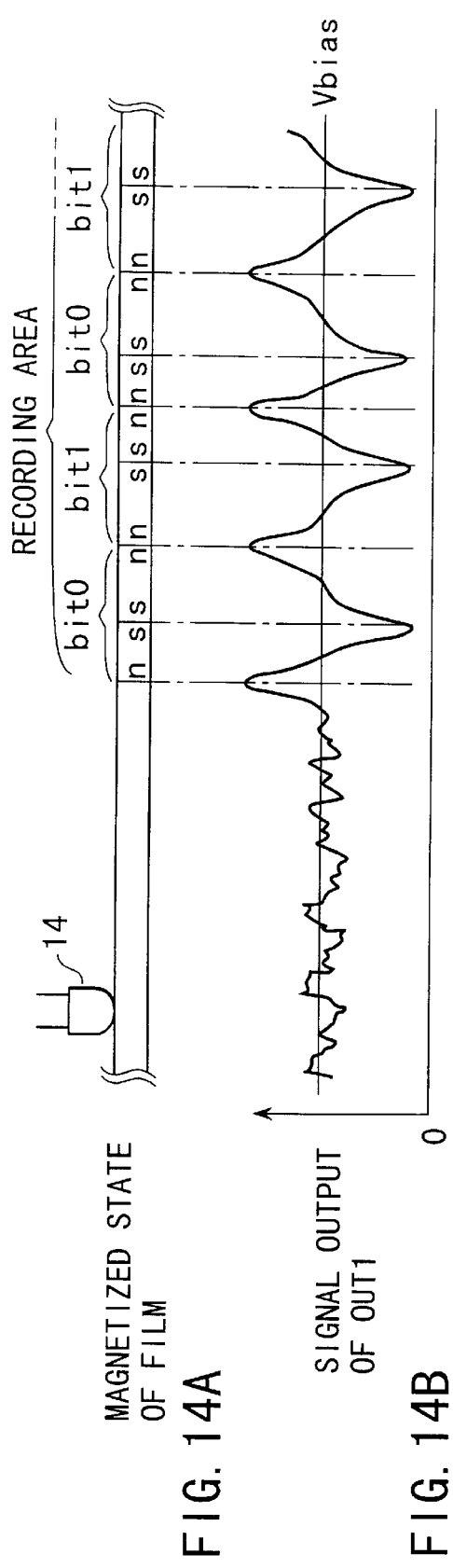
FIG. 14A
FIG. 14B
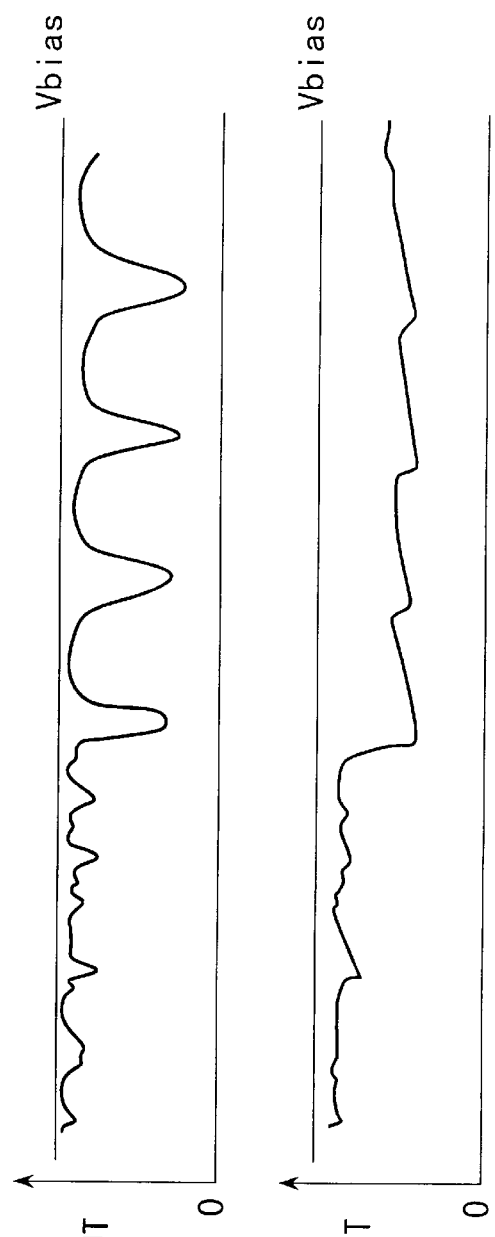
FIG. 14C
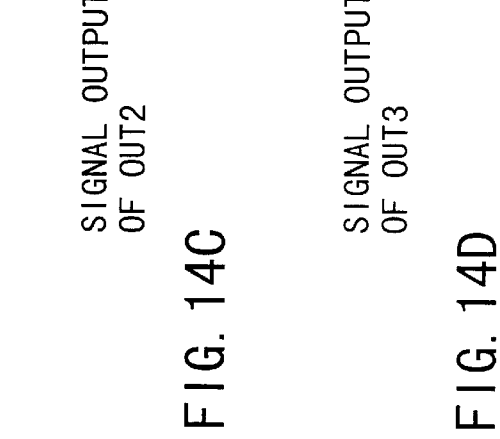
FIG. 14D

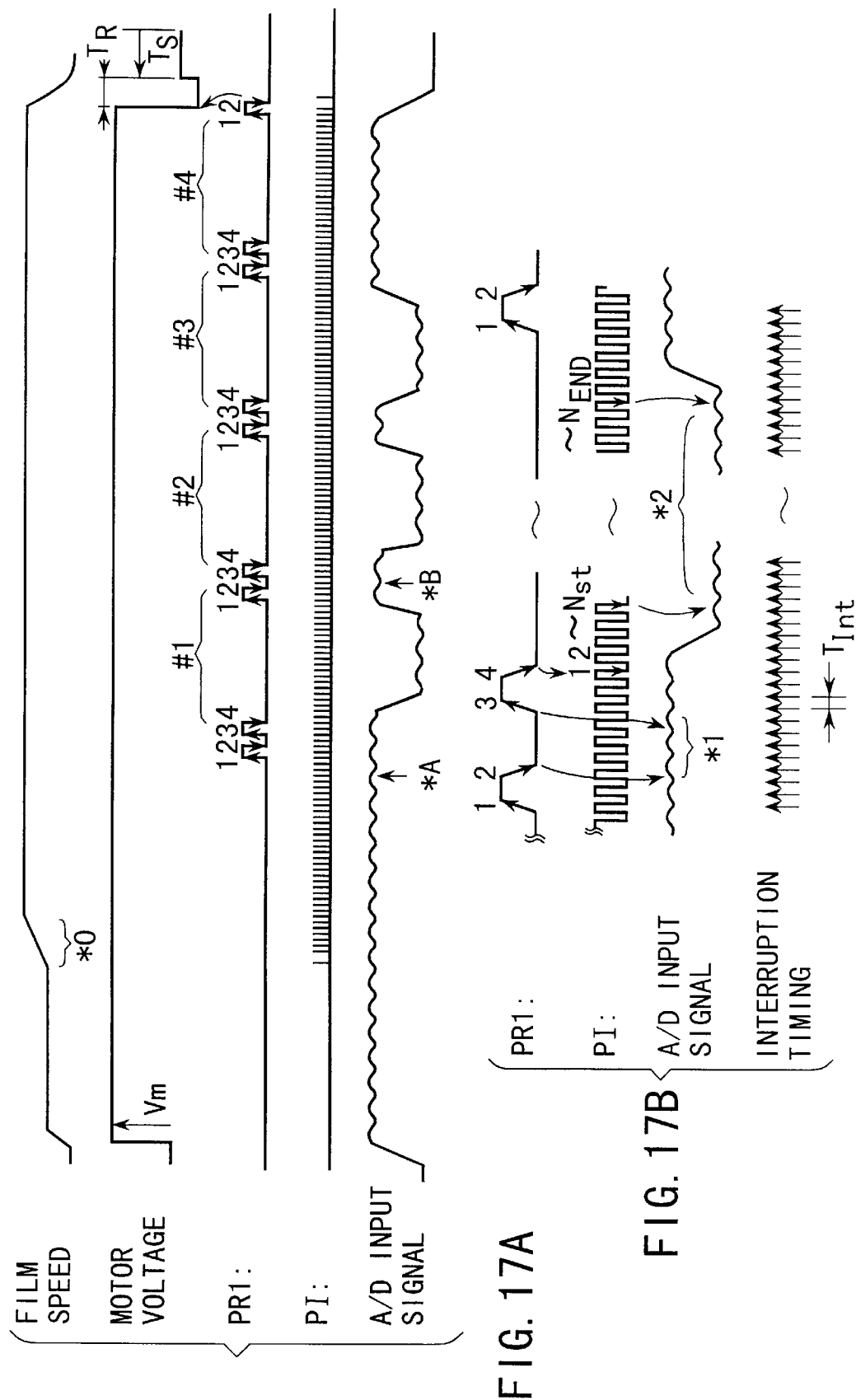

6,094,542

CAMERA USING CARTRIDGE WHICH CAN BE REPLACED IN THE COURSE OF USAGE

BACKGROUND OF THE INVENTION

This invention relates to a camera using a film having a magnetic recording portion, for detecting an unexposed frame by detecting the presence or absence of magnetic information recorded on the film when a film cartridge having some frames photographed is loaded.

Conventionally, film cartridge type camera systems in which films can be easily replaced are proposed. In a camera using a cartridge film having a magnetic recording area, the amplitude of a reproduction signal of magnetic information recorded on the film is normally proportional to the movement speed of the film. However, the film movement speed at the time of feeding of the film in the camera is unstable in some cases, and therefore, the amplitude of the reproduction signal is not stable.

Since a magnetic layer formed on the film is formed to be substantially transparent so as not to cause any problem in photographing, the amplitude of the reproduction signal is not so large. Further, since a motor mounted on the camera main body generates noises harmful to a circuit in the main body at the time of driving, it is difficult to reproduce information magnetically recorded on the film with a high S/N ratio.

Therefore, various conventional techniques are provided to stably detect the reproduction signal by changing the gain of the amplifier in the reproducing circuit, changing the characteristic of the filter to eliminate the noise, or changing the film feeding speed according to the conditions of reproduction.

The technique for measuring the level of a noise signal contained in the reproduction signal and determining a determination level used for determining the presence or absence of magnetic information based on the noise level is disclosed in Jpn. Pat. KOKAI Publication No. 9-211662. By use of this method, it is possible to detect the magnetic information even if the S/N ratio is low to some extent.

The noise generated from the camera can be dealt with by shielding the motor or properly changing the design of the reproducing circuit. However, when the condition in which the user uses the camera is taken into consideration, it cannot be said that a perfect method is provided.

Recently, in an environment in which the camera is used, various electronic devices for generating electromagnetic noises, for example, a personal computer, portable telephone, television, radio device are used. The user may replace film cartridges irrespective of the environment of electromagnetic noises.

However, in the environment in which the electromagnetic noises are generated, magnetic information cannot be successfully detected in some cases. That is, in such a case (in the environment in which the electromagnetic noises are generated), there occur problems that a frame of double exposure may be provided and a frame or some frames which are unexposed may be provided in the successive exposed frames.

BRIEF SUMMARY OF THE INVENTION

Accordingly, an object of this invention is to provide a camera using a cartridge which can be replaced in the course of usage or after it is partly used, for stably detecting a frame having magnetic data and a frame having no magnetic data and preventing at least occurrence of a frame of double exposure and an unexposed frame even if the S/N ratio of the reproduction signal is lowered by the electromagnetic noise and the presence of magnetic data cannot be detected.

A first object of this invention is to provide a film feeding device capable of detecting an unexposed frame of a partly exposed cartridge, comprising readout means having a magnetic head, for reading out data from a magnetic recording portion of a film cartridge loaded; position detecting means for detecting the position of perforations of a film and determining whether the magnetic head is set in contact with a recording area adjacent to an exposed frame defined by the perforation or a recording inhibition area adjacent to a portion other than the exposed frame; setting means for setting a threshold value used for determining the presence or absence of magnetic data based on an output of the readout means when the position detecting means determines that the magnetic head is set in contact with the recording inhibition area; determining means for comparing the output of the readout means with the threshold value to determine whether or not the magnetic data is recorded in the recording area; and control means for determining whether the operation of the readout means is permitted or inhibited according to the output of the determining means and making the unexposed frame detecting operation invalid when a difference between the threshold value and a preset value is large.

A second object of this invention is to provide a film feeding device capable of detecting an unexposed frame of a partly exposed cartridge, comprising a feeding mechanism for feeding a film; a magnetic head set in contact with a magnetic recording portion of the film, for detecting the magnetized state of the magnetic recording portion; a reproducing circuit for outputting a reproduction signal in response to an output of the magnetic head; position detecting means for determining whether the magnetic head lies inside a recording area of the magnetic recording portion or outside the recording area; a setting circuit for setting a threshold value used for determining the presence or absence of magnetic data in the magnetic recording portion according to the reproduction signal generated when it is determined that the magnetic head lies outside the recording area; an information detecting circuit for comparing the threshold value with the reproduction signal when it is determined that the magnetic head lies outside the recording area to determine whether or not the magnetic data is recorded in the recording area; and a control module for determining whether the operation of the feeding means is permitted or inhibited according to the output of the information detecting circuit and making the unexposed frame detecting operation invalid when a difference between the threshold value and a preset value is large.

A third object of this invention is to provide a film feeding device capable of detecting an unexposed frame of a partly exposed cartridge, wherein the device stores a readout signal from a magnetic recording inhibition area corresponding to a portion between adjacent exposed frames of a film loaded, as a threshold value used for determining a no-signal level, compares a readout signal from a magnetic recording area corresponding to the exposed frame with the stored signal level, and determines the presence or absence of magnetic data in the magnetic recording area and at the same time makes invalid the unexposed frame detecting operation when a difference between the threshold value and a preset value is large.

A fourth object of this invention is to provide a film feeding device capable of detecting an unexposed frame of a partly exposed cartridge, comprising feeding means for feeding a film contained in the film cartridge loaded; readout means having a magnetic head set in contact with a magnetic recording portion of a film, for reading out a signal from the magnetic recording portion when the film is fed by the feeding means; position detecting means for detecting whether or not the magnetic head lies in the recording area of the magnetic recording portion; storing means for storing an output of the readout means as a threshold value used for no-signal level determination when it is detected that the magnetic head does not lie in the recording area; determining means for comparing the output of the readout means with the stored no-signal determination value to determine whether or not data is recorded in the recording area when it is detected that the magnetic head lies in the recording area; and control means for interrupting the operation of the feeding means when the determining means determines that data is recorded in the recording area and making the unexposed frame detecting operation invalid when a difference between the threshold value and a preset value is large.

A fifth object of this invention is to provide a film feeding device capable of detecting an unexposed frame of a partly exposed cartridge, comprising film feeding means for feeding a film contained in the film cartridge loaded; magnetic head position detecting means for determining whether a magnetic head for reading out data from the film lies in a data recording area or in a data recording inhibition area; no-signal level storing means for storing an output signal of the magnetic head obtained when the magnetic head lies inside the data recording inhibition area as a threshold value used for no-signal level determination; and control means for comparing the output signal of the magnetic head obtained when the magnetic head lies inside the data recording area with the no-signal level and determining the presence of an unexposed frame when a difference between the compared signal levels is smaller than a preset value, interrupting the operation of the film feeding means and making the unexposed frame detecting operation invalid when a difference between the threshold value and a preset value is large.

A sixth object of this invention is to provide a film feeding device for detecting an unexposed frame of a partly exposed cartridge loaded by storing a readout signal from a data recording inhibition area as a threshold value used for no-signal level determination and comparing the threshold value with a readout signal from a data recording area, comprising means for comparing the threshold value with a preset value and generating an output signal when a difference between the compared values is large; and means for interrupting the unexposed frame detecting operation in response to the output signal of the generating means.

A seventh object of this invention is to provide a film feeding device for detecting an unexposed frame of a partly exposed cartridge loaded by storing a readout signal from a data recording inhibition area as a threshold value used for no-signal level determination and comparing the threshold value with a readout signal from a data recording area, comprising detecting means for evaluating an envelope level of the readout signal to detect a spurious noise contained in the readout signal; and means for interrupting the unexposed frame detecting operation in response to the output signal of the detecting means.

An eighth object of this invention is to provide a camera capable of using a partly exposed cartridge, comprising readout means having a magnetic head, for reading out data from a magnetic recording portion of a film cartridge loaded; position detecting means for detecting the position of a perforation of a film and determining whether the magnetic head is set in contact with a data recording area defined by the perforation or a recording inhibition area lying outside the recording area; setting means for setting a threshold value used for determining the presence or absence of magnetic data based on an output of the readout means when the position detecting means determines that the magnetic head is set in contact with the recording inhibition area; determining means for comparing the output of the readout means with the threshold value to determine whether or not the magnetic data is recorded in the recording area based on the result of comparison; a nonvolatile memory for storing a predetermined determination value which can be updated; and control means for comparing the determination value stored in the nonvolatile memory with an output signal of the readout means obtained when it is determined that the magnetic head is set in contact with the recording inhibition area to determine whether the operation of the readout means is permitted or inhibited.

In this invention, the determination value used for determining the presence or absence of magnetic information is determined by using a noise level in the non-data recording area of each frame as a reference. Therefore, even if the S/N ratio is low, the presence or absence of magnetic information can be determined without fail.

Further, the unexposed detecting operation itself is interrupted when the noise level in the non-data recording area becomes larger than a preset level, and the film is rewound into the cartridge. Then, the exposure display (VEI) of the cartridge is returned to the same position as that set when the cartridge is loaded. As a result, occurrence of a problem that a frame of double exposure is provided can be prevented in the worst case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A to 14D are diagrams showing signals in various portions (OUT1, OUT2, OUT3) when a reproducing circuit 58b' of FIG. 13 is operated;

FIGS. 17A and 17B are timing charts for illustrating the operation of the subroutine "unexposed frame detection" in the third embodiment of this invention.

DETAILED DESCRIPTION OF THE INVENTION

There will now be described embodiments of this invention with reference to the accompanying drawings.

Figure 1:
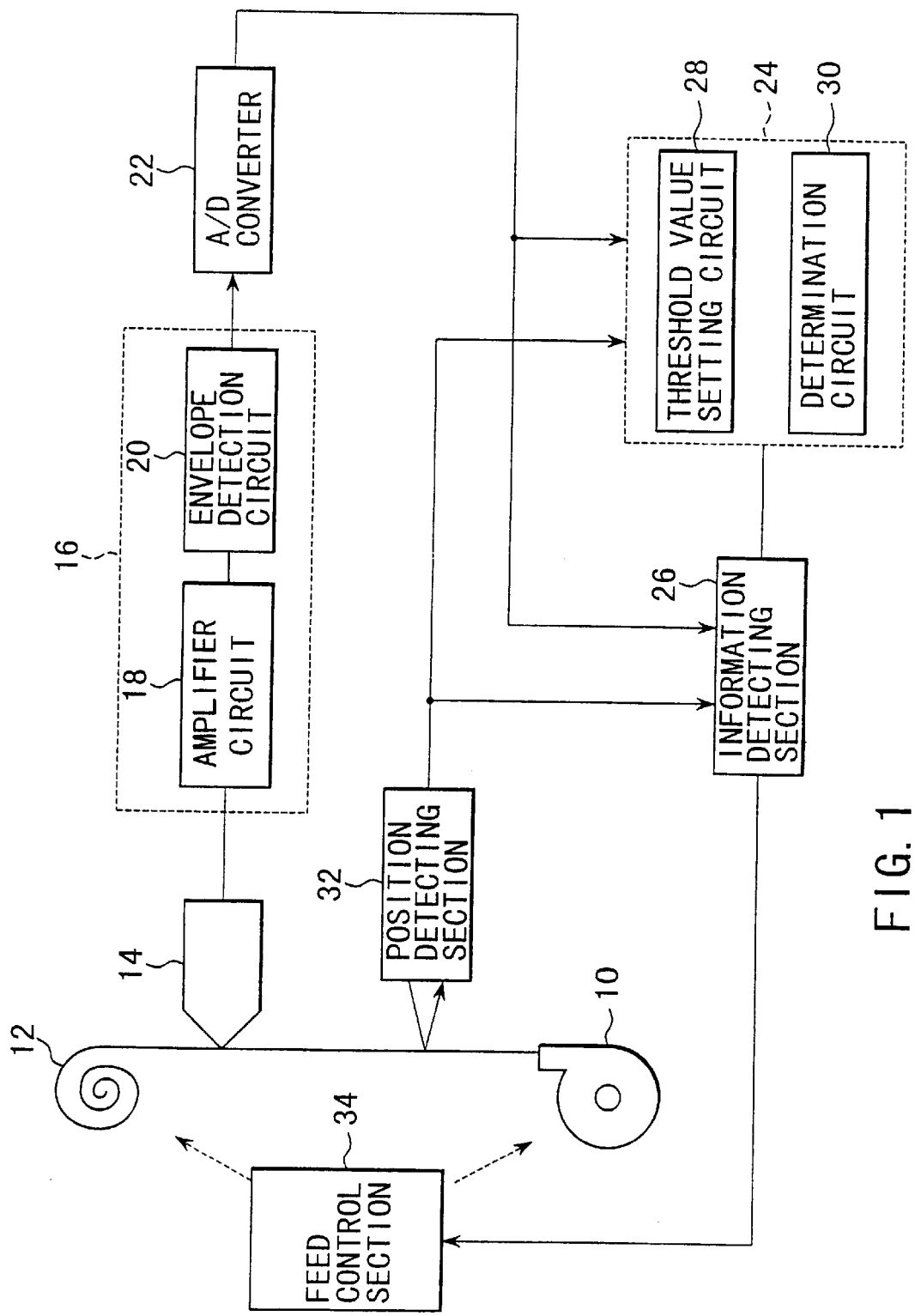
FIG. 1 is a construction diagram showing the concept of a camera using a cartridge which can be replaced in the course of usage according to a first embodiment of this invention.

FIG. 1 is a construction diagram showing the concept of a camera using a cartridge which can be replaced in the course of usage according to a first embodiment of this invention.

As shown in FIG. 1, a magnetic head 14 is disposed to be set in contact with a magnetic recording layer (not shown) of a film 12 which is supplied from a film cartridge 10. An output of the magnetic head 14 is supplied to an amplifier circuit 18 and envelope detecting circuit 20 constructing a reproducing circuit 16 and then supplied to a determining section 24 and information detecting section 26 via an A/D converting section 22. The determining section 24 is constructed by a threshold value setting circuit 28 and determination circuit 30 and the result of determination therein is supplied to the information detecting section 26. Information of a position detecting section 32 disposed near the film 12 is output to the determining section 24 and information detecting section 26. A feed control section 34 controls the film 12 based on an output of the information detecting section 26.

With the above construction, if the magnetic head 14 is set in contact with the magnetic recording layer (not shown) of the film 12, a signal corresponding to the magnetized state of the magnetic body of the film 12 is output to the reproducing circuit 16. Then, a reproduction signal processed by the amplifier circuit 18 and envelope detecting circuit 20 in the reproducing circuit 16 is A/D converted in the A/D converting section 22 and then output to the determining section 24 and information detecting section 26.

In the position detecting section 32, perforations (not shown) formed on the film 12 are detected. Therefore, it is possible to detect whether the magnetic head 14 slides on the recording area on the film 12 or slides on an area other than the recording area. The detection output is supplied to the determining section 24 and information detecting section 26.

In the determining section 24, the minimum value of the reproduction signal output from the reproducing circuit 16 is detected from an A/D converted value when the magnetic head 14 lies on the area other than the recording area of the film 12. In the threshold value setting circuit 28, a threshold value necessary for determining the presence or absence of magnetic information is created based on the detected minimum value. Further, in the determination circuit 30, whether the minimum value is larger than a preset value or not is determined. In this case, if the minimum value is larger than the preset value, it is determined that the magnetic information detecting operation itself cannot be effected and the operation of the information detecting section 26 is inhibited.

In the information detecting section 26, the A/D converted value and the threshold value are compared with each other when the magnetic head 14 lies on the recording area. Then, if it is detected as the result of comparison that the A/D converted value is larger than the threshold value for a preset number of successive times, it is determined that magnetic information is present. In the other cases, it is determined that the magnetic information is not present.

In a case where the magnetic information is present, it is determined that the exposed frame is being fed. Therefore, the feeding operation of the film 12 is successively effected by the feed control section 34. On the other hand, if the magnetic information is not present, it is determined that an unexposed frame is detected. In this case, the feeding operation of the feed control section 34 is interrupted.

Further, in a case where it is determined in the determination circuit 30 that the magnetic information detecting operation cannot be effected, the film 12 is fed back to the film cartridge 10 after the feeding operation of the feed control section 34 is interrupted.

Next, the second embodiment of this invention is explained.

Figures 2A, 2B:
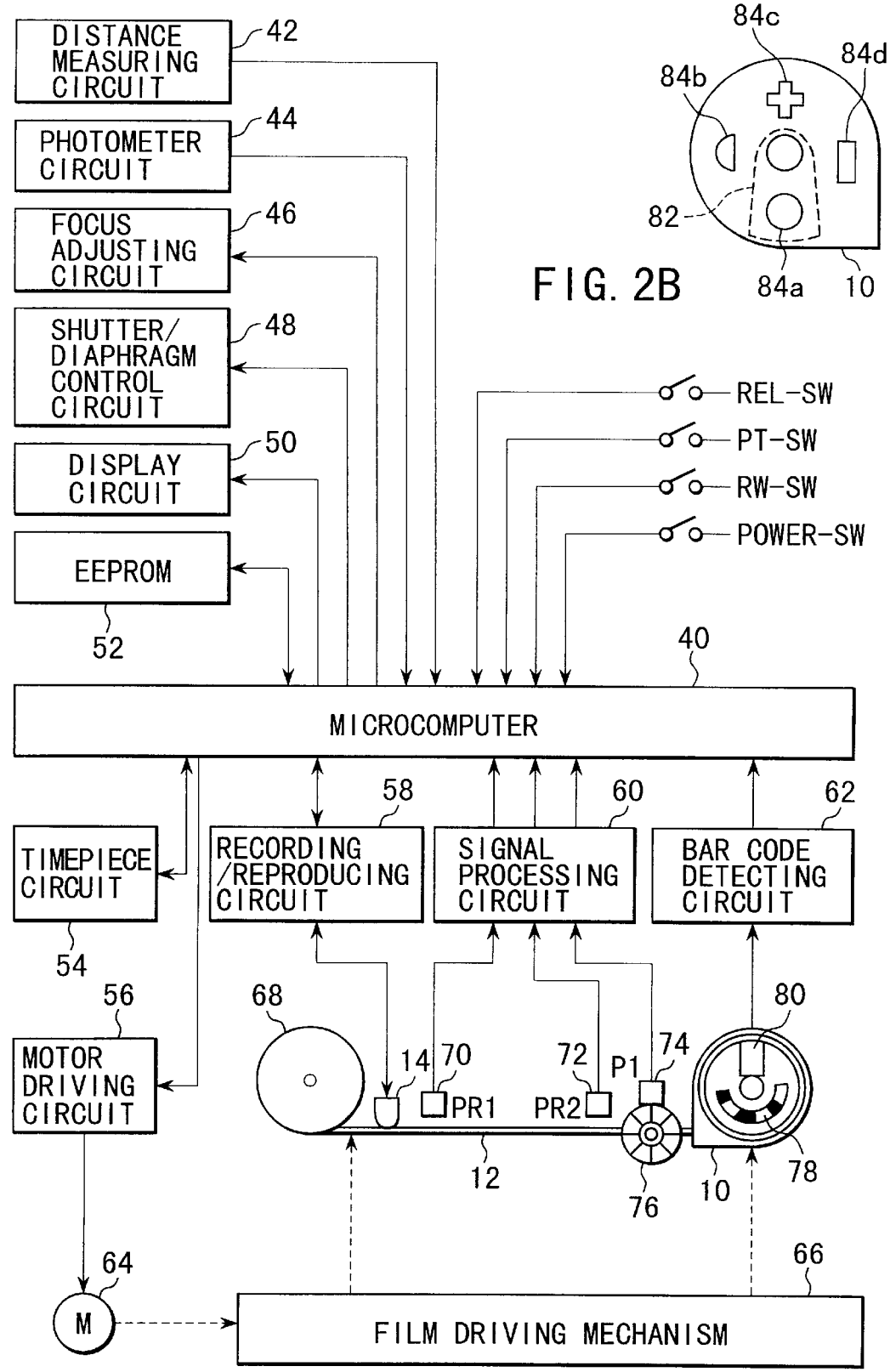
FIG. 2A is a block diagram showing a second embodiment of a camera using a cartridge which can be replaced in the course of usage according to this invention.
FIG. 2B is a view showing a film cartridge 10 shown in FIG. 2A and observed in the opposite direction.

FIG. 2A is a block diagram showing the second embodiment of a camera using a cartridge which can be replaced in the course of usage according to this invention.

In FIG. 2A, a microcomputer 40 is a main portion for controlling the operation of the camera. To the microcomputer 40, a motor and sensors necessary for the basic control and operation of the camera and various mechanisms are connected via corresponding circuits as shown in FIG. 2A.

That is, to the microcomputer 40, the basic control circuit of the automatic camera including a distance measuring circuit 42 for measuring the distance to an object, a photometer circuit 44 for measuring the luminance of the object, a focus adjusting circuit 46, a shutter/diaphragm control circuit 48, a display circuit 50, an EEPROM 52 and a timepiece circuit 54, a motor driving circuit 56, a recording/reproducing circuit 58, a signal processing circuit 60 and a bar code detecting circuit 62 are connected.

Further, a power switch (POWER-SW), rewind switch (RW-SW), cartridge switch (PT-SW) and release switch (REL-SW) are connected to the microcomputer 40.

The power switch (POWER-SW) is a main switch which is interlocked with the power supply system of the camera and the camera can be operated under the control of the microcomputer 40 while the switch is set in the ON state. The rewind switch (RW-SW) is a switch manually operated by the user when the film which is partly used for photographing is rewound to the film cartridge.

The release switch (REL-SW) is a switch for starting the focus adjusting operation and exposure operation. Further, the cartridge switch (PT-SW) is a switch for detecting the presence or absence of the film cartridge 10. The cartridge switch (PT-SW) is kept in the ON state when the film cartridge 10 is loaded on the camera main body and is kept in the OFF state when the cartridge is not loaded.

In the microcomputer 40, turn-ON states of the above switches are detected via the input port based on a program which will be explained later. At the same time, the "feeding-out operation" of the film 12 is instructed by the motor driving circuit 56 and a film feeding motor 64 is driven to drive a film driving mechanism 66 so as to permit the cartridge replacing function to be automatically effected.

Further, in the microcomputer 40, the focus adjusting circuit 46 is controlled based on distance information obtained from the distance measuring circuit 42 so as to effect the focus adjusting operation. Further, the shutter/diaphragm control circuit 48 is controlled by the microcomputer 40 based on luminance information obtained from the photometer circuit 44 so as to expose the film 12.

The display circuit 50 displays information associated with exposure, the number of frames of the film and the like and various control parameters are stored in the EEPROM 52. Further, the timepiece circuit 54 is a circuit for generating information such as "year", "month", "date", "hour" and "minute" necessary for magnetic recording.

The motor driving circuit 56 is connected to the film driving mechanism 66 via the film feeding motor 64. The film driving mechanism 66 drives the film cartridge 10 and a film winding spool 68.

The film 12 is fed out from the film cartridge 10 by rotation of a spool (not shown) in the film cartridge 10. The feeding-out operation is effected by use of the film feeding motor 64 and a driving mechanism including a gear train 96, a driven gear 122 and a fork member 128, for rotating the spool by the driving operation of the motor as will be described later. The driving force of the film feeding motor 64 is also transmitted to the spool 68 and the film 12 is wound around the spool 68 when the film fed out has reached the spool 68.

Further, when the film 12 is fed out from the film cartridge 10, the feeding-out circumferential speed V1 of the film cartridge 10 and the circumferential speed V2 at which the film 12 is wound on the spool 68 is set with the relation of V1<V2. Therefore, after the film 12 is first wound around the spool 68, the film is fed by means of the spool 68.

The film feeding motor 64 is driven by the motor driving circuit 56, but the driving control operation is generally effected by the microcomputer 40 for executing a preset program as will be described later.

Near the film 12 fed between the film cartridge 10 and the spool 68, the magnetic head 14 connected to the recording/reproducing circuit 58 and the photo-reflector (PR1) 70, photo-reflector (PR2) 72 and photo-interrupter (PI) 74 connected to the signal processing circuit 60 are arranged.

The microcomputer 40 can detect a perforation (not shown) of the film 12 according to the output signals from the photo-reflectors 70 and 72. Based on the output signal, the stop position of the film 12 is detected by the microcomputer 40. The output signal is also used as one of timing signals necessary for magnetic recording on the film 12.

The magnetic head 14 is driven by the recording/reproducing circuit 58 and used for recording data on the magnetic body of the film and reproducing recorded data. A reproduction signal from the magnetic head 14 is converted into a signal which can be detected by the microcomputer 40 by means of the recording/reproducing circuit 58 and then supplied to the microcomputer 40.

Near the photo-interrupter 74 and the film 12, a disk 76 having a slit and rotated in an interlocked manner with the movement of the film 12 is disposed. The photo-interrupter 74 generates an analog signal according to the rotation speed of the disk 76. The analog signal is converted into a digital pulse by the signal processing circuit 60 and then input to the microcomputer 40. That is, the microcomputer 40 can detect the traveling distance and movement speed of the film 12 based on the signal generated from the photo-interrupter 74.

Therefore, in the microcomputer 40, the movement speed is calculated based on the signal of the photo-interrupter 74 during the film feeding operation and the recording frequency for magnetic recording is determined. Then, a driving signal is output to the recording/reproducing circuit 58 based on the thus determined frequency.

A disk 78 which is interlocked with the rotation of the spool shaft (not shown) in the cartridge 10 is disposed on the film cartridge 10 and a bar code as shown in FIG. 2A is printed on the disk 78. In the bar code, information associated with the characteristics of the film and the film cartridge is recorded in a coded form. Therefore, sensitivity information of the film, information of the number of photographing frames, negative/positive information and the like can be obtained by determining the bar code.

The exposure state of the film 12 can be detected depending on the initial position thereof. The exposure state of the film 12 is displayed on the indicator for the user.

FIG. 2B is a view showing the film cartridge 10 shown in FIG. 2A and observed in the opposite direction. As shown in FIG. 2B, an indicator 82 is interlocked with the spool shaft and rotated and the indicator 82 is disposed on the surface of the cartridge opposite to the disk 78 and can display four states. Four windows 84a, 84b, 84c and 84d with characteristic shapes formed on the rear surface of the film cartridge 10 respectively indicate "unexposed", "partly exposed", "all exposed" and "completion of development". The exposure state of the film can be determined based on the position of the indicator 82 set in one of the positions of the four windows 84a to 84d.

Readout of information recorded in the bar code is effected by detecting the disk 78 fixed on the spool by use of a photosensor 80 while the disk 78 is being rotated in a direction opposite to the feeding-out direction of the film 12. The photosensor 80 has a photo-reflector (PR) for applying light onto the disk 78 and receiving the reflected light. Thus, a variation in the amount of reflected light caused by the presence or absence of the bar code can be detected.

In the bar code detecting circuit 62, the analog output of the photosensor 80 is converted into a digital pulse and then supplied to the microcomputer 40. In the microcomputer 40, the digital pulse is decoded to determine the information.

Figure 3:
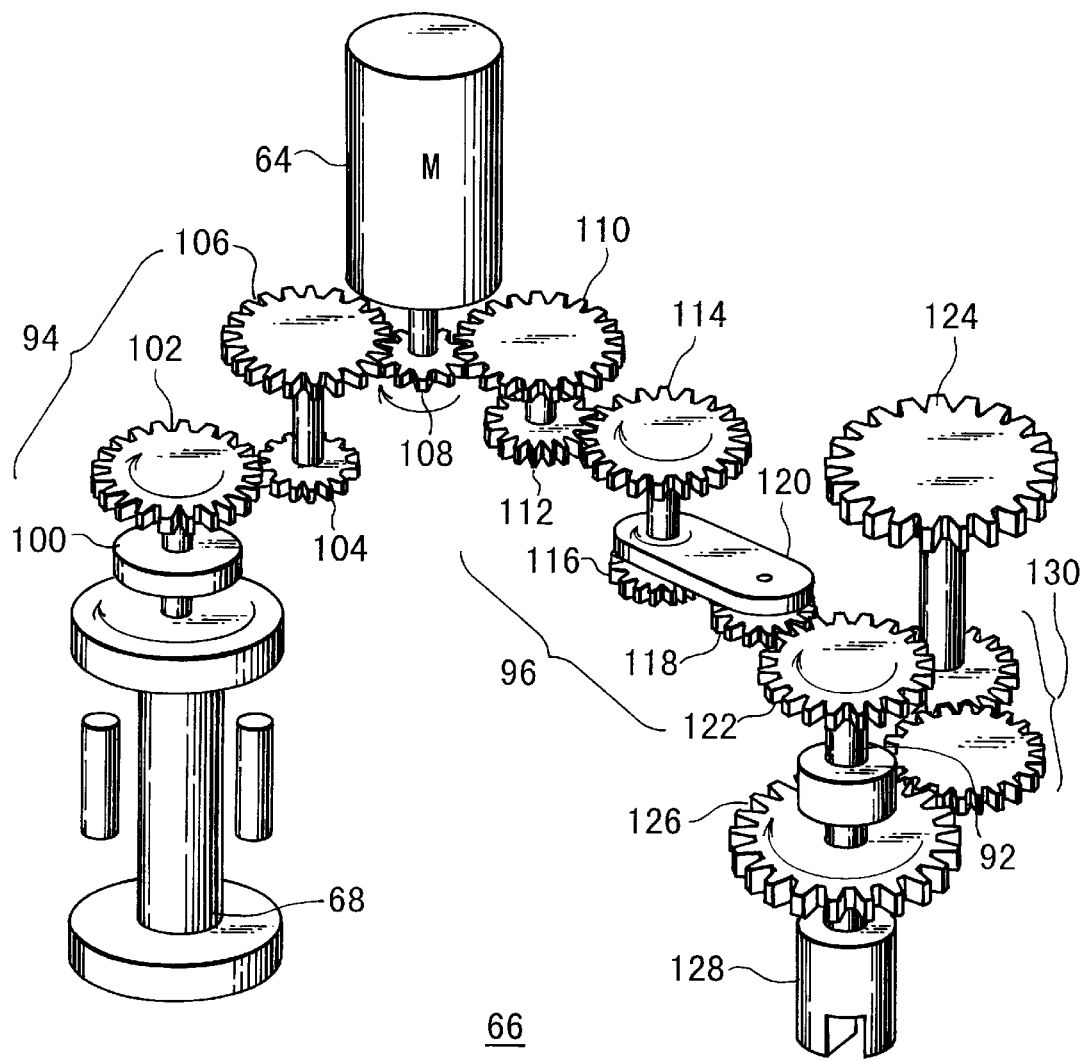
FIG. 3 is a view for illustrating the mechanical construction of a film driving mechanism 66.

Next, the mechanical construction of the film driving mechanism 66 is explained with reference to FIG. 3.

The film driving mechanism 66 has the film feeding motor (M) 64 which is a single driving source for driving the film winding shaft (which is hereinafter referred to as a spool) 68 and a rewinding shaft 92 and further includes a gear train 94 which couples the film feeding motor 64 with the spool 68 and a gear train 96 which couples the motor 64 with the rewinding shaft 92.

The former gear train 94 has a lower gear ratio than the latter gear train 96 and the film winding speed of the spool 68 is set to be higher than the feeding-out speed from the cartridge (not shown) by the rewinding shaft 92.

The gear train 94 includes a one-way clutch 100 and gears 102, 104 and 106. The one-way clutch 100 transmits the driving force of the film feeding motor 64 to the spool 68 via a gear 108 and the gears 106, 104 and 102 at the film winding time. Further, the one-way clutch 100 acts so as not to transmit the driving force of the motor 64 to the spool 68 when the film is separated from the spool 68.

The gear train 96 includes gears 110 and 112, gear 114 and planet lever 120 (which includes a sun gear 116 and a planet gear 118) and the driving force of the motor 64 is transmitted to the sun gear 116 engaged with the planet gear 118. Two driven gears 122 and 124 driven by the planet gear 118 are separately provided on the front end side of the gear train 96 and one of the driven gears 122 and 124 with which the planet gear 118 is engaged is determined according to the rotation direction of the motor 64.

The driven gear 122 drives a fork member 128 via a one-way clutch 126 and rewinding shaft 92. If the driving force of the motor 64 for feeding out the film from the film cartridge is transmitted to the driven gear 122, the one-way clutch 126 couples the driven gear 122 with the fork member 128 to feed out the film from the cartridge. However, if the film is pulled towards the exterior of the cartridge at a speed higher than the feeding-out speed, the connection made by the one-way clutch 126 is cut off and the pulling force is not transmitted to the driven gear 122.

The other driven gear 124 is coupled to the fork member 128 via a gear train 130. The transmission mechanism functions when the driving force of the motor 64 for rewinding is transmitted to the planet gear 118.

Next, the "feeding-out" operation of the film in the film feeding section of the camera with the above construction and the "winding" and "rewinding" operations at the normal photographing time are explained.

Assume now that the film feeding motor 64 is rotated in one direction to feed out the film. Then, the gear train 94 is driven by the rotation and the spool 68 is driven. At this time, the gear train 96 is driven and the planet gear 118 and the driven gear 122 are engaged with each other to rotate the fork member 128 via the rewinding shaft 92. As a result, the film is fed out.

If the film is fed out and wound on the spool 68 and the "feeding-out" operation is completed, the connection made between the driven gear 122 and the fork member 128 by the one-way clutch 126 lying therebetween is cut off since the winding speed (V2) of the spool 68 is higher than the feeding-out speed (V1) of the rewinding shaft 92 as described before, and as a result, only the fork member 128 is rotated. At the "winding" time after the normal photographing operation, the fork member 128 is rotated by the similar operation.

Further, in the case of "rewinding", if the film feeding motor 64 is rotated in a direction opposite to that in the case of the "winding" or "feeding-out", the connection between the driven gear 102 and the spool 68 is cut off by the one-way clutch 52. Therefore, the driving force transmitted to the driven gear 102 is not transmitted to the spool 68 and the spool 68 is not rotated.

If the film feeding motor 64 is rotated in a direction opposite to that in the case of winding (feeding-out), the planet gear 118 and the driven gear 126 are engaged with each other. As a result, the driving force transmitted from the motor 64 to the planet gear 118 of the gear train 96 is transmitted to the driven gear 126. Then, the fork member 128 is rotated in the rewinding direction via the gear train 130. The film is rewound by the rotation of the fork member 128.

Figure 4:
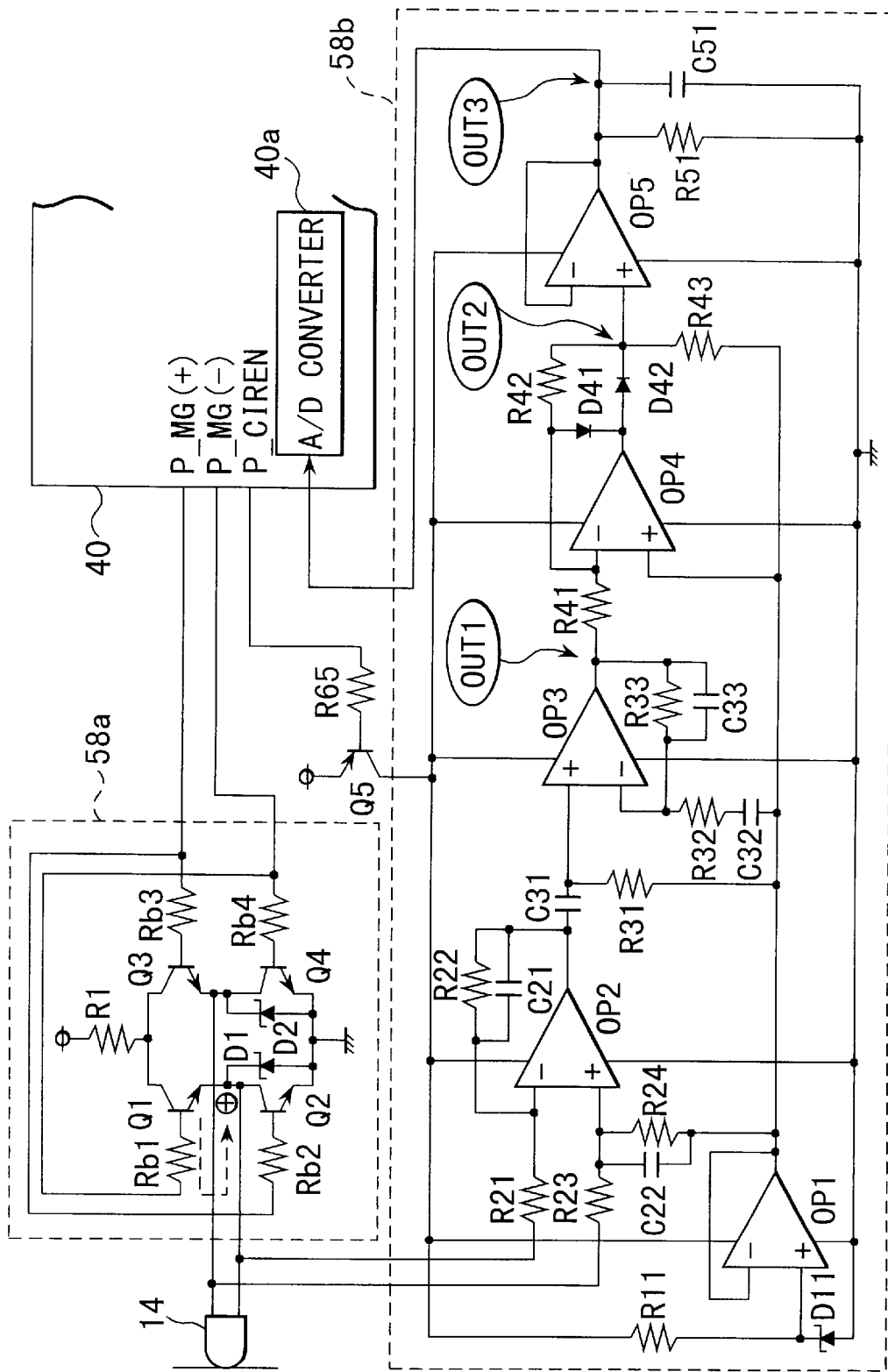
FIG. 4 is a diagram showing a detail circuit construction of a recording/reproducing circuit 58 and a peripheral portion thereof.

FIG. 4 is a diagram showing a detail circuit construction of the recording/reproducing circuit 58 and the peripheral portion thereof.

The recording/reproducing circuit 58 is constructed by a magnetic driving circuit 58a and a reproducing circuit 58b which are known in the art.

The driving circuit 58a for the magnetic head 14 includes series-connected transistors Q1, Q2, series-connected transistors Q3, Q4, current limiting resistors Rb1, Rb2, Rb3, Rb4 respectively connected to the bases of the transistors Q1, Q2, Q3, Q4, and a resistor R1 provided for limiting a current flowing in the magnetic head 14. Zener diodes D1, D2 which are respectively connected between the two ends of the magnetic head 14 and the ground node (GND) are provided to suppress the flyback voltage generated from the magnetic head 14 at the time of magnetic recording.

A current flowing into the magnetic head 14 is controlled by output ports P_MG(+) and P_MG(-) of the microcomputer 40. For example, in order to cause a current to flow in a (+) direction as shown in FIG. 4, it is only necessary to set the voltage of P_MG(+) from the low level (Low) to the high level (High). As a result, the transistors Q2, Q3 are turned ON by currents flowing in the limiting resistors Rb2, Rb3. Therefore, a current flows in a direction indicated by broken lines in the driving circuit 58a to magnetize the magnetic body on the film with which the magnetic head 14 is set in contact in a preset direction. Thus, preset data is recorded on the recording area on the film as will be described later.

In order to cause a current to flow in a direction opposite to the direction indicated by the broken lines in the driving circuit 58a of FIG. 4, it is only necessary to set the voltage of P_MG(-) from Low to High. Further, if no current is caused to flow in the magnetic head 14 or data on the film is reproduced from the magnetic head 14, the voltages of P_MG(+) and P_MG(-) are set at Low.

The reproducing circuit 58b is used for converting an output signal of the magnetic head 14 into a signal which can be detected by the A/D converter 40a of the microcomputer 40.

The reproducing circuit 58b is controlled by an output port P_CIREN of the microcomputer 40. If the voltage of the output port P_CIREN is set from High to Low, a transistor Q5 is turned ON by a current flowing in a resistor Rb5 and is set into an operable state.

The reproducing circuit 58b includes a known bias circuit which is constructed by an operational amplifier OP1, Zener diode D11 and resistor R11. A bias voltage generated from the bias circuit is supplied to a differential amplifier, non-inverting amplifier and half-wave rectifier circuit which will be described later.

The differential amplifier includes an operational amplifier OP2, resistors R21, R22, R23, R24, and capacitors C21, C22 respectively connected in parallel with the resistors R22, R24, and amplifies a reproduction signal of the magnetic head 14. However, it is difficult to amplify the reproduction signal to a necessary level only by use of the one-stage differential amplifier.

Therefore, the non-inverting amplifier including an operational amplifier OP3, resistors R31, R32, R33, and capacitors C31, C32, C33 is connected to the succeeding stage of the differential amplifier. The output of the differential amplifier is further amplified by the non-inverting amplifier.

For example, in order to reproduce magnetic information of an IX240 cartridge film, it is necessary to set the amplification factor of the amplifier to approx. 90 to 110 [dB]. The necessary amplification factor is determined by taking into consideration the sensitivity of the magnetic head, the film speed at the time of reproduction, and the input range of the A/D converter of the microcomputer. Further, the frequency range of the amplifiable signal is determined by taking the recording density of magnetic information and the film speed at the time of reproduction into consideration.

The half-wave rectifier circuit including an operational amplifier OP4, resistors R41, R42, R43 and Schottky barrier diodes D41, D42 is connected to the succeeding stage of the non-inverting amplifier.

A reproduction signal subjected to the half-wave rectification by the half-wave rectifier circuit is subjected to impedance conversion by a voltage follower constructed by an operational amplifier OP5. A parallel circuit of a resistor R51 and a capacitor C51 is connected to the output of the voltage follower. The envelope signal of a reproduction signal is created by adequately determining the time constant determined by the resistor R51 and capacitor C51.

FIGS. 5A to 5D are diagrams showing signals in various portions (OUT1, OUT2, OUT3) when the reproducing circuit 58b of FIG. 4 is operated.

Figure 5:
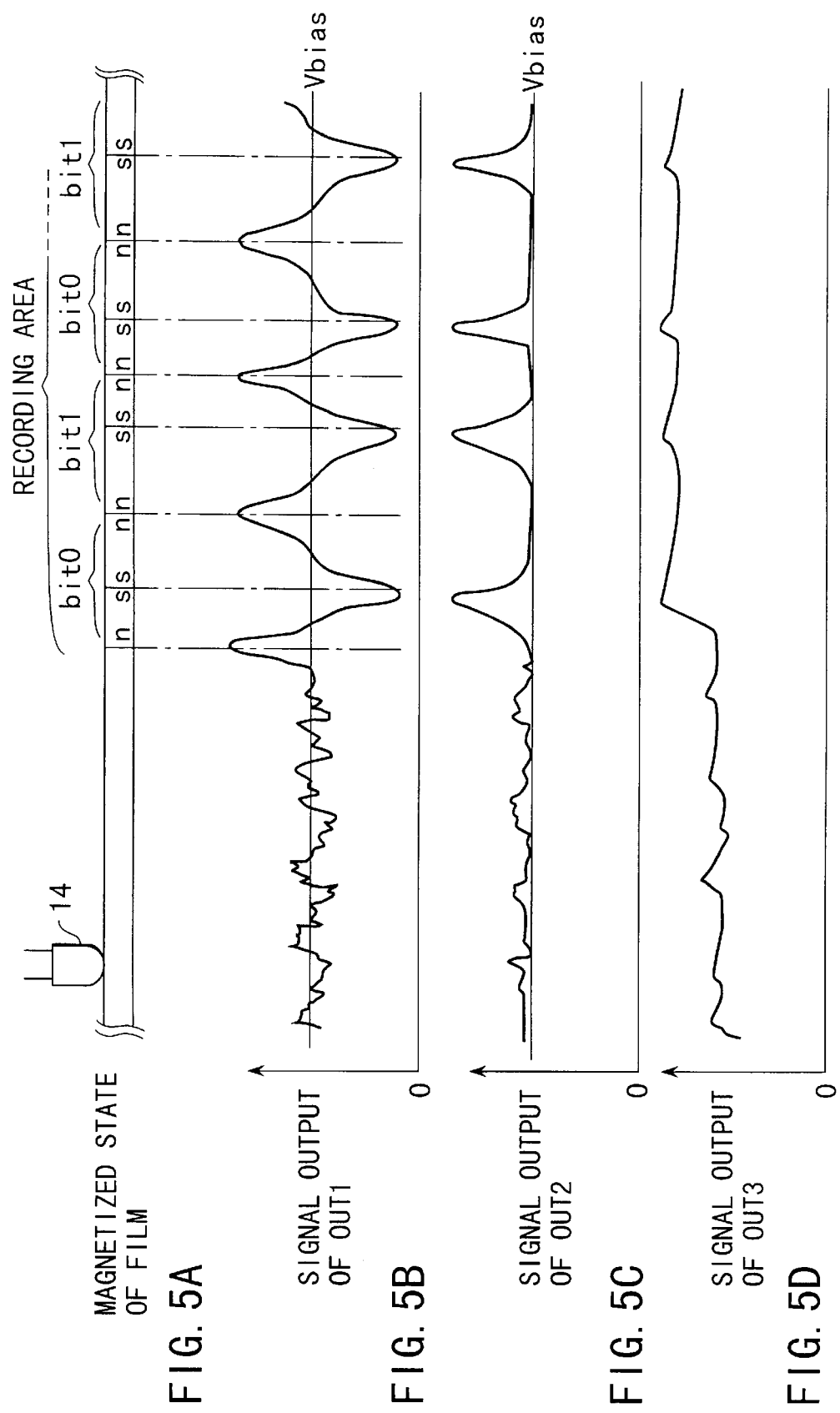
FIGS. 5A to 5D are diagrams showing signals in various portions (OUT1, OUT2, OUT3) when a reproducing circuit 58b of FIG. 4 is operated.

FIG. 5A shows the magnetized state of the film and it is assumed that "0", "1", "0", "1" are recorded in the recording area.

FIG. 5B is a timing chart for illustrating the operation of a signal of the output OUT1 of the non-inverting amplifier of FIG. 4.

An output of the magnetic head 14 is amplified and appears on the output OUT1. The output of the magnetic head 14 is amplified by using the bias voltage (Vbias) output from the operational amplifier OP1 as a reference. When the magnetic head 14 relatively slides on the recording area on the film, a reproduction signal corresponding to the magnetized state of the film appears on the output OUT1. When the magnetic head 14 does not lie in the recording area, a noise signal mainly generated from the amplifier appears on the output OUT1.

FIG. 5C is a timing chart for illustrating the operation of a signal of the output OUT2 of the half-wave rectifier circuit of FIG. 4. Only a signal portion smaller than Vbias of the output OUT1 is inverted with Vbias used as a reference by the half-wave rectifier circuit and appears on the output OUT2 of the half-wave rectifier circuit.

FIG. 5D is a timing chart for illustrating the operation of a signal of the output OUT3 of the voltage follower of FIG. 4. The envelope signal of a signal of the output OUT2 appears on the output OUT3. The amplitude of the envelope signal is detected by the A/D converter 40a of the microcomputer 40 and if the amplitude in the recording area and the amplitude in an area other than the recording area are compared with each other, whether or not magnetic information is present in the recording area can be determined.

Figure 6:
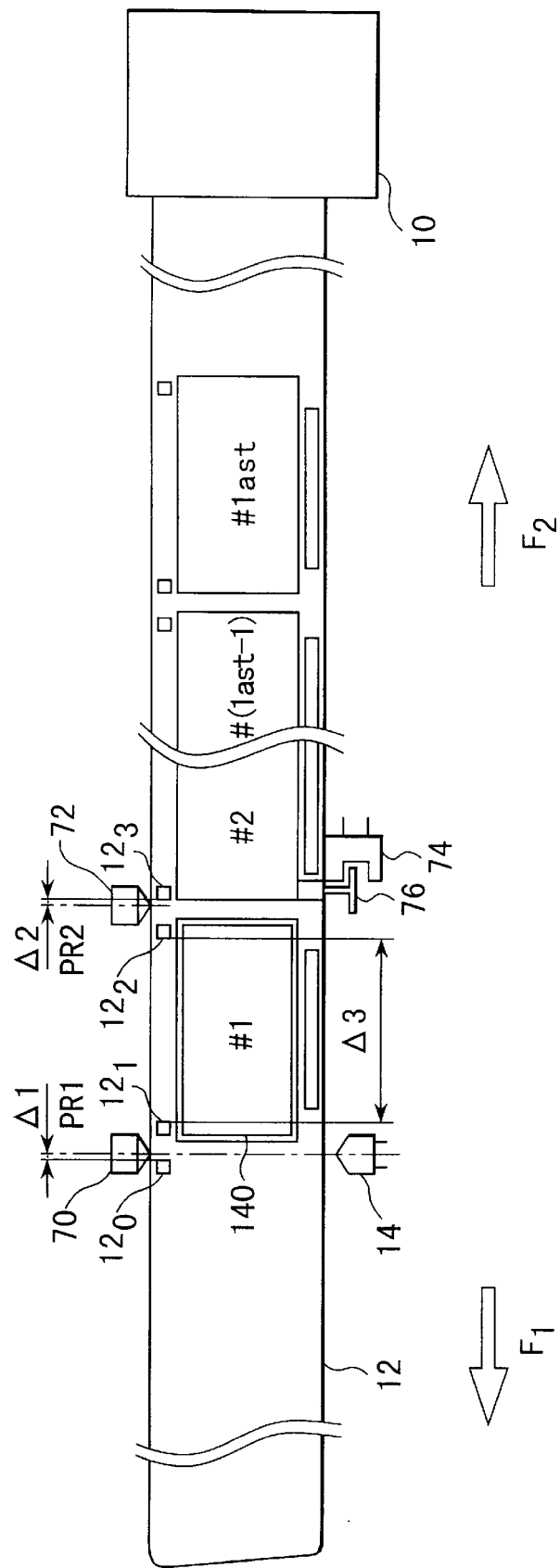
FIG. 6 is a view showing the arrangement of a magnetic head 14, photo-reflectors 70 and 72, and photo-interrupter 74 in the camera.

FIG. 6 is a view showing the arrangement of the magnetic head 14, photo-reflectors 70 and 72 and photo-interrupter 74 in the camera.

In FIG. 6, a state in which a frame of a frame number 1 (#1) correctly faces an aperture 140 is shown. The photo-reflector 70 is a sensor for detecting the stop position of the film 12 when the film 12 is moved in a winding direction $F_1$ indicated in FIG. 6. The position of the frame on the film 12 is defined by two adjacent perforations and the position of the frame number 1 indicated in FIG. 6 is determined by perforations $12_0$ and $12_1$. When the film is moved in an $F_1$ direction of FIG. 6 which is a winding direction, the frame number 1 can be positioned with respect to the aperture 140 by use of the perforation $12_0$ and the photo-reflector 70.

The photo-reflector 72 is a sensor for detecting the stop position of the film 12 when the film 12 is moved in the direction $F_2$ indicated in FIG. 6. The frame number 1 can be positioned with respect to the aperture 140 by use of a perforation $12_3$ and the photo-reflector 72.

The photo-reflector 70 is disposed in a position offset from the perforation by $\Delta 1$ in FIG. 6 in the rewinding ($F_2$) direction. In this case, $\Delta 1$ indicates an overrun amount occurring when the film is moved in the winding direction.

The photo-reflector 72 is disposed in a position offset from the perforation by $\Delta 2$ in FIG. 6 in the winding ($F_1$) direction. In this case, $\Delta 2$ indicates an overrun amount occurring when the film is moved in the rewinding direction.

The magnetic head 14 is disposed on the central axis of the photo-reflector 70. The recording area of magnetic information lies below the photographing frame and is arranged in a portion ($\Delta 3$) between the perforations $12_1$ and $12_2$. At the time of magnetic recording, the perforation is detected by the photo-reflector 70 and the magnetic head 14 is controlled so as to record information in the portion $\Delta 3$.

Next, the operation of the camera according to this invention is explained.

Figure 7A:
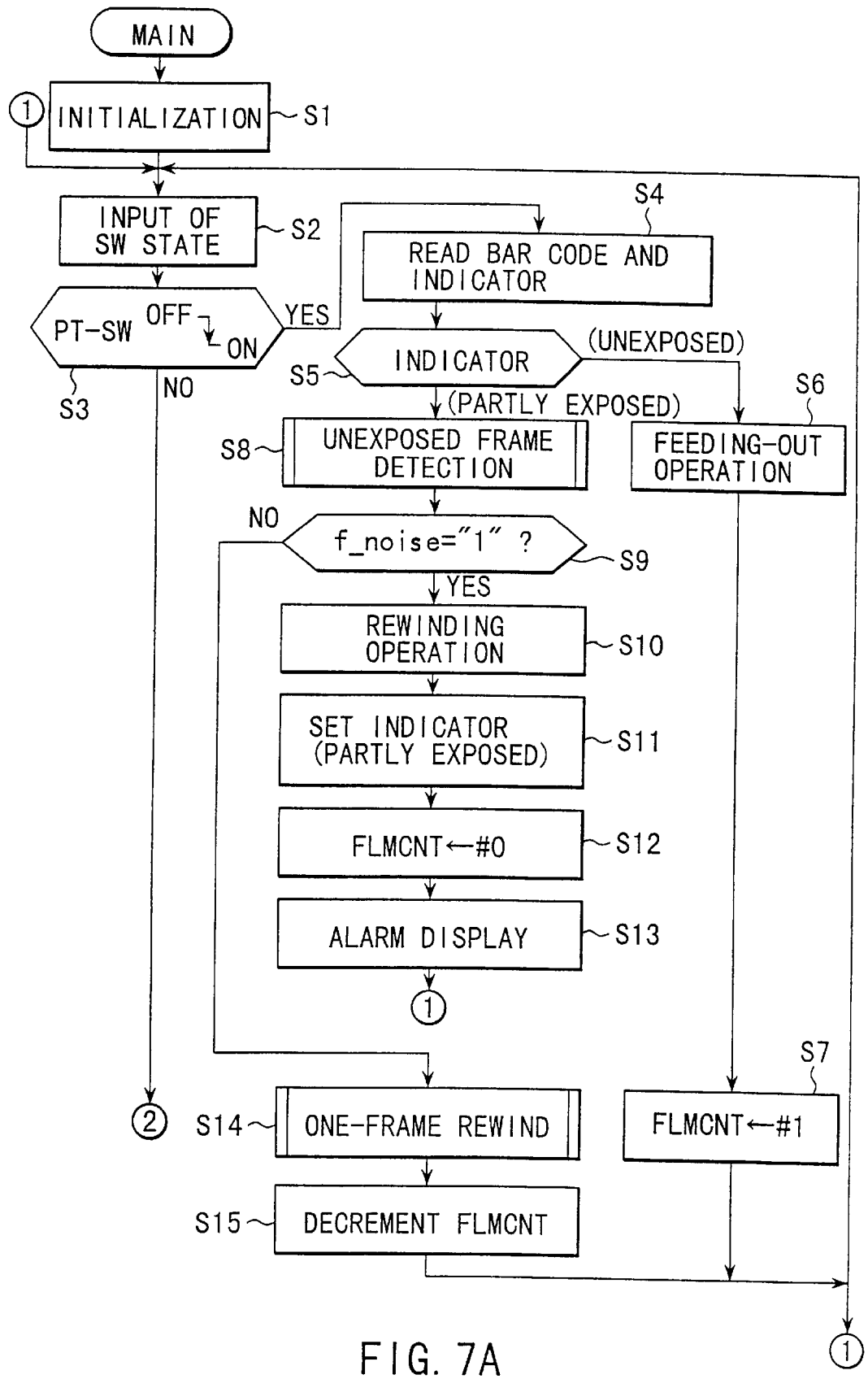
FIGS. 7A and 7B are flowcharts for illustrating the operation of the main routine of the camera sequence according to this invention.
Figure 7B:
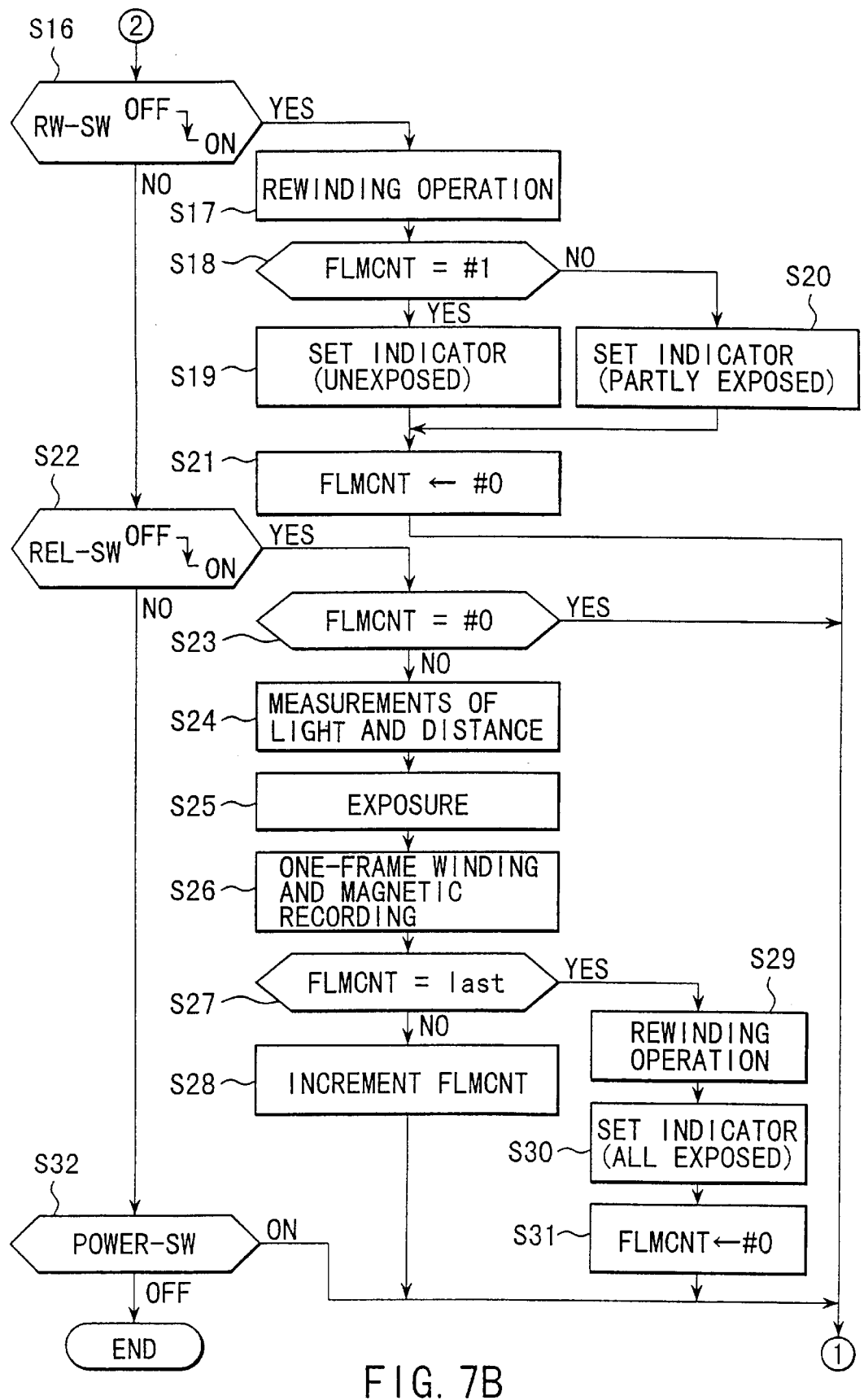

FIGS. 7A and 7B are flowcharts for illustrating the operation of the main routine of the camera sequence according to this invention. In this case, particularly, much attention is paid to the film feeding operation and the explanation thereof is made.

First, when the power switch (POWER-SW) is turned ON by the user, the operation of the camera is started. Then, the power-ON reset operation is effected by the microcomputer 40 which is the central control unit and an initialization process such as initialization of the I/O port and initialization of a memory are effected in the step S1.

In the step S2, states of the various switches including the cartridge switch (PT-SW), rewind switch (RW-SW), release switch (REL-SW) and power switch (POWER-SW) are input via the input port. Since the operation in the step S2 is periodically effected in the main routine, a change in the states of the switches is instantly detected.

Then, in the step S3, whether a preset change is made in the state of the cartridge switch (PT-SW) or not is determined. At this time, if the film cartridge 10 is loaded on the camera main body, the cartridge switch (PT-SW) is changed from the OFF state to the ON state. If the change is detected, the step S4 is effected. If the change is not detected, the step S16 which will be described later is effected.

In the step S4, the spool shaft of the film cartridge 10 is rotated and film information is read out from the attached bar code. The film information contains the number of photographing frames and the sensitivity. Further, the state of usage of the film is detected according to the initial position of the bar code.

As described before, like the bar code, the position of the indicator 82 which is interlocked with the spool shaft and rotated indicates the state of usage of the film 12. Therefore, one of the four states of "unexposed", "partly exposed", "all exposed" and "completion of development" can be determined by determining the state of the indicator 82.

Next, in the step S5, whether the state of usage of the indicator 82 is "partly exposed" or "unexposed" is determined. If it is "unexposed", the step S6 is effected and the feeding-out operation is effected. In the step S6, the film 12 is fed out from the film cartridge 10, wound around the spool 68 and further wound until the frame number 1 reaches a position in which it faces the aperture 140.

Then, in the step S7, the frame number 1 (#1) is set into FLMCNT. FLMCNT is a register for storing the number (order) of a frame which faces the aperture. After this, the step S2 is effected again.

If the indicator 82 indicates "partly exposed" in the step S5, the step S8 is effected. If the film which is partly exposed is loaded, it is impossible to effect the photographing operation from the frame number 1. Therefore, it becomes necessary to detect an unexposed frame based on magnetic data on the film before the photographing operation.

In the step S8, the subroutine "unexposed frame detection" is executed. If the subroutine is executed, the film 12 is fed out from the film cartridge 10 and wound around the spool 68. Then, the winding operation of the film 12 is further effected. At this time, the reproducing operation of magnetic data from the film 12 is effected. The winding operation of the film 12 is effected until a signal is no more reproduced from the film 12. The detail operation of the subroutine "unexposed frame detection" is explained later.

When the subroutine "unexposed frame detection" is terminated, the state of a control flag f__noise is determined in the step S9. The control flag f__noise is a flag which is set (←1) when a large amount of noise signals are contained in the output signal of the reproducing circuit and the detecting operation of the unexposed frame cannot be effected. If the control flag f__noise is "0", it indicates that the detecting operation of the unexposed frame has been successfully effected and the step S14 which will be described later is effected. However, if the control flag f__noise is "1", the step S10 is effected and the film 12 is rewound into the film cartridge 10.

In the next step S11, the indicator 82 is set to a position of "partly exposed". Then, in the step S12, FLMCNT is cleared. In the step S13, alarm display is made on the display circuit 50. This informs the user that the camera is set in an environment in which magnetic data cannot be reproduced.

For example, the display operation informs the user that an electronic device which generates electromagnetic noises is present near the camera and the camera is influenced by the electromagnetic noise. In this case, since the film cartridge 10 is set in the same state as that at the time of loading, the user may change the place and load the film cartridge 10 again. After this, the step S2 is effected again.

When the process is changed from the step S9 to the step S14, the subroutine "one-frame rewind" is executed. If the subroutine is executed, the film is rewound by one frame. Then, a frame of the smallest number among the unexposed frames comes to face the aperture 140. The detail operation of the subroutine "one-frame rewind" is explained later.

The reason why the film is rewound by one frame is to solve a problem occurring in the operation of the subroutine "unexposed frame detection" (step S8). That is, it is necessary to additionally wind the film by one frame from the head portion of the unexposed frame in order to completely detect the unexposed frame because of the arrangement of the magnetic head 14.

For example, assume now that the frame numbers 1 to 3 of the film 12 loaded are "already exposed". Then, if the subroutine "unexposed frame detection" is executed, the fifth frame faces the aperture. Since the fourth frame is the head frame among the unexposed frames, it is necessary to rewind the film by one frame. Therefore, the process of the subroutine "one-frame rewind" in the step S16 is necessary.

Thus, if the film is rewound by one frame in the step S14, the step S15 is effected to decrement (−1) the value of FLMCNT by one. As a result, since a new unexposed frame faces the aperture 140, the exposure operation can be effected.

When the process is changed from the step S3 to the step S16, whether a change in the state of the rewind switch (RW-SW) is made or not is determined. The rewind switch (RW-SW) is a switch operated when it is required to take out the film cartridge 10 from the camera in the course of the photographing operation. Therefore, if the rewind switch (RW-SW) is changed from the OFF state to the ON state, the film 12 must be rewound into the film cartridge 10. For this purpose, the step S17 is effected and the rewinding operation of the film 12 is effected.

Then, in the next step S18, whether the value of FLMCNT is #1 or not is determined. If it is #1, it is determined that the film 12 is rewound without effecting the photographing operation at all. Therefore, the step S19 is effected and the indicator 82 is set to a position of "unexposed". After this, FLMCNT is cleared in the step S21 and the step S2 is effected again.

In a case where it is detected in the step S18 that the value of FLMCNT is not #1, it is determined that an exposed frame is present. In this case, the step S20 is effected and the indicator 82 is set to a position of "partly exposed". Then, FLMCNT is cleared in the step S21 and the step S2 is effected again.

If it is determined in the step S16 that no change is made in the state of the rewind switch (RW-SW), the step S22 is effected to determine whether a change is made in the state of the release switch (REL-SW). In this case, if the release switch (REL-SW) is changed from the OFF state to the ON state, the step S23 is effected.

In the step S23, whether the value of FLMCNT is #0 or not is determined. If the value of FLMCNT is #0, the frame of the film 12 does not face the aperture 70 and it is determined that the exposure operation cannot be effected and the step S2 is effected again.

If it is determined in the step S23 that the value of FLMCNT is not #0, the exposure operation can be effected and the step S24 is effected.

In the step S24, information of a distance to an object is input from the distance measuring circuit 42, the focus adjusting circuit 46 is controlled based on the information to focus the camera on the object (that is, distance measuring process). At the same time, luminance information of the object is input from the photometer circuit 44 and the shutter speed and diaphragm opening are determined based on the luminance information (that is, photometric or light measuring process).

Next, in the step S25, the shutter diaphragm control circuit 48 is controlled to expose the film 12. Then, in the step S26, the film 12 is wound by one frame and the driving circuit 58a is controlled during the winding operation by the microcomputer 40 to effect the magnetic recording operation.

After this, in the step S27, whether or not the value of FLMCNT is equal to "last" indicting the maximum number of photographing frames of the loaded film is determined. The value "last" can be previously detected from the bar code on the film cartridge 10. If it is determined in the step S27 that the value of FLMCNT does not reach "last", the step S28 is effected to increment the value of FLMCNT by one.

On the other hand, if it is determined in the step S27 that the value of FLMCNT reaches "last", the step S29 is effected and the film 12 is rewound into the film cartridge 10. Then, in the step S30, the indicator 82 is set to the position "all exposed". Next, in the step S31, FLMCNT is cleared.

Thus, the exposure operation is continuously effected until the value of FLMCNT reaches "last".

If it is determined in the step S22 that no change is made in the state of the release switch (REL-SW), the step S32 is effected and the state of the power switch (POWER-SW) is detected. If the power switch (POWER-SW) is kept in the ON state, the step S2 is effected to continue the operation. On the other hand, if the power switch (POWER-SW) is set in the OFF state, the operation is terminated and the operation of the microcomputer is interrupted.

Figure 8A:
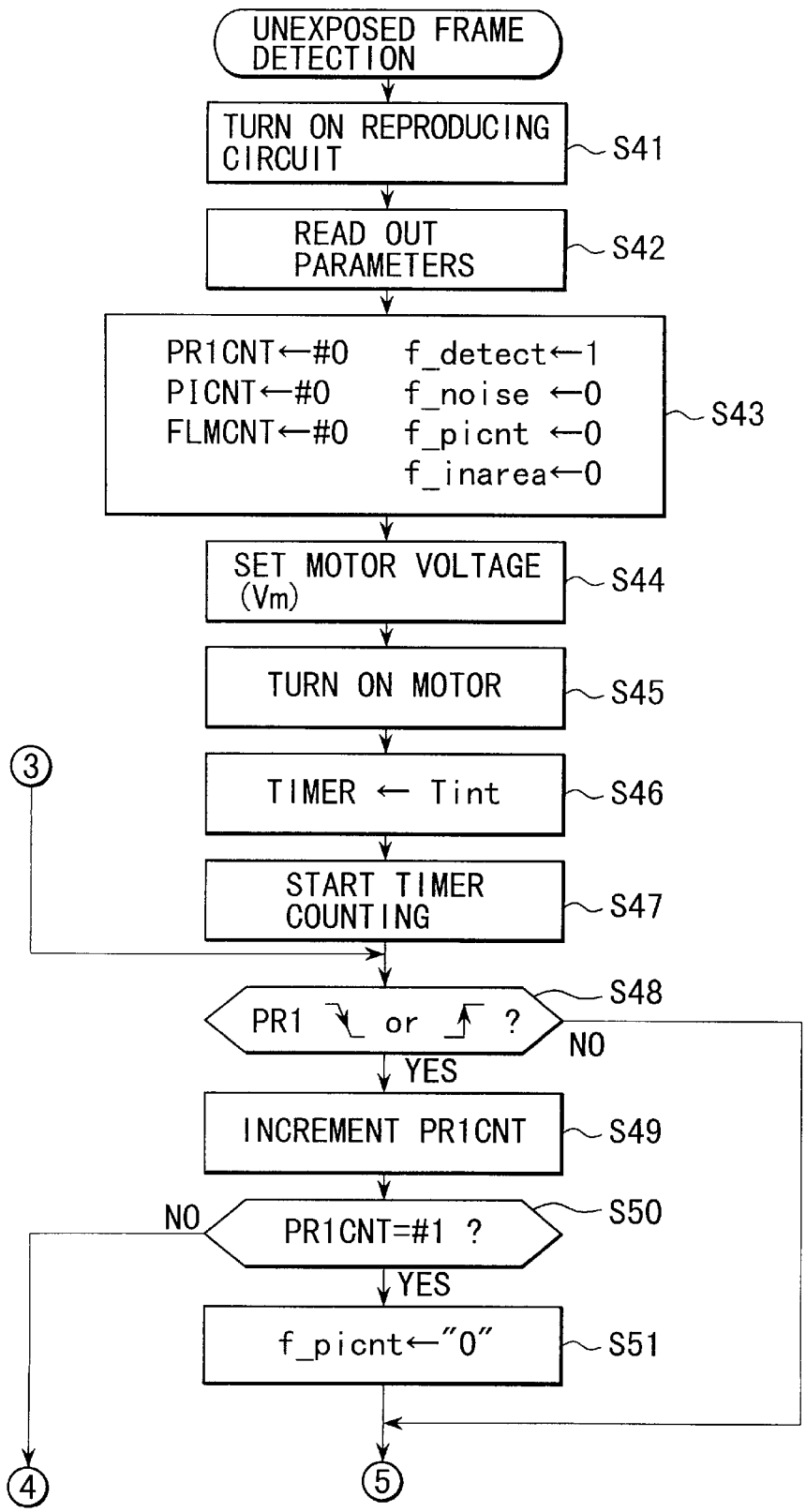
FIGS. 8A to 8C are flowcharts for illustrating the detail operation of the subroutine "unexposed frame detection"
Figure 8B:
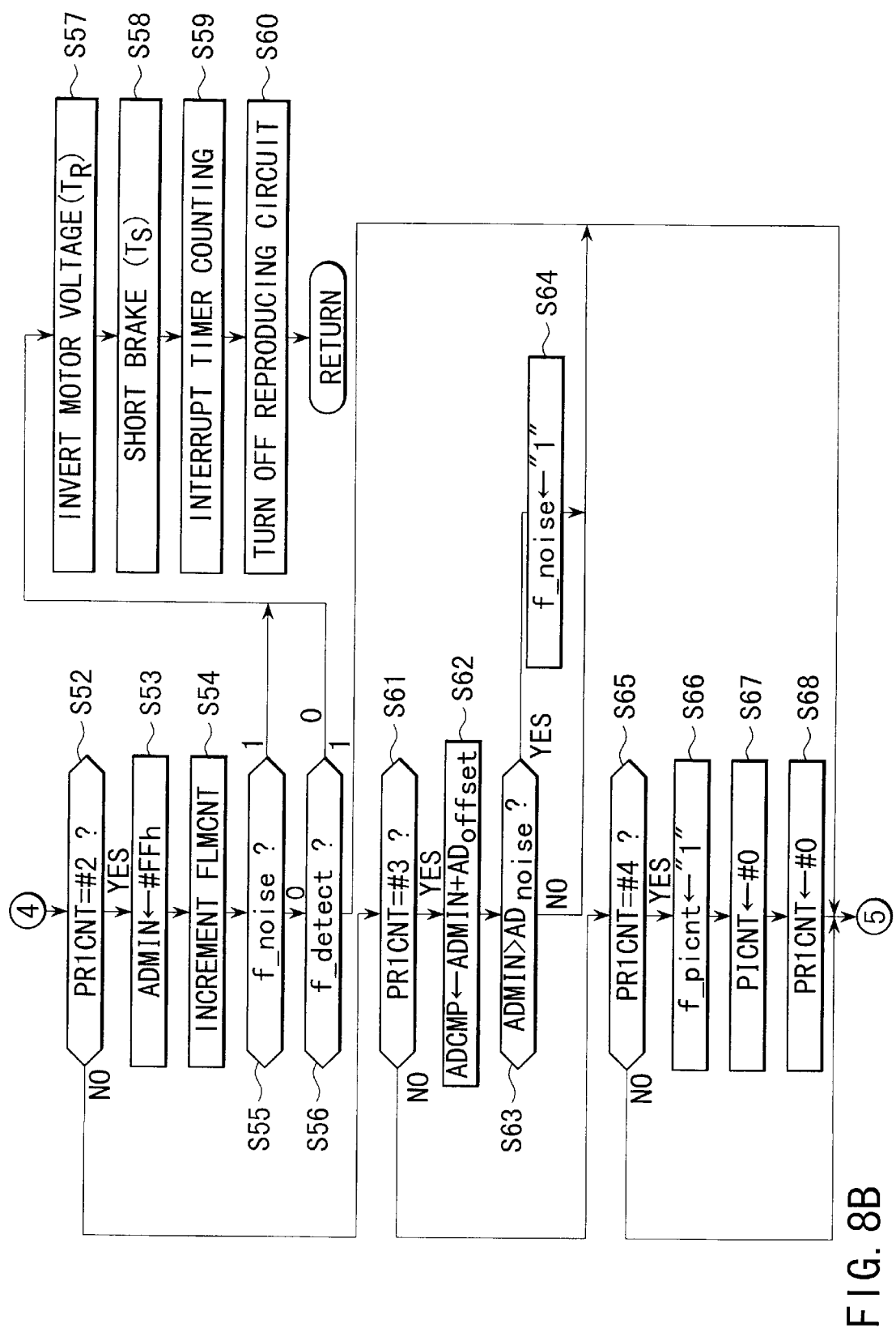
Figure 8C:
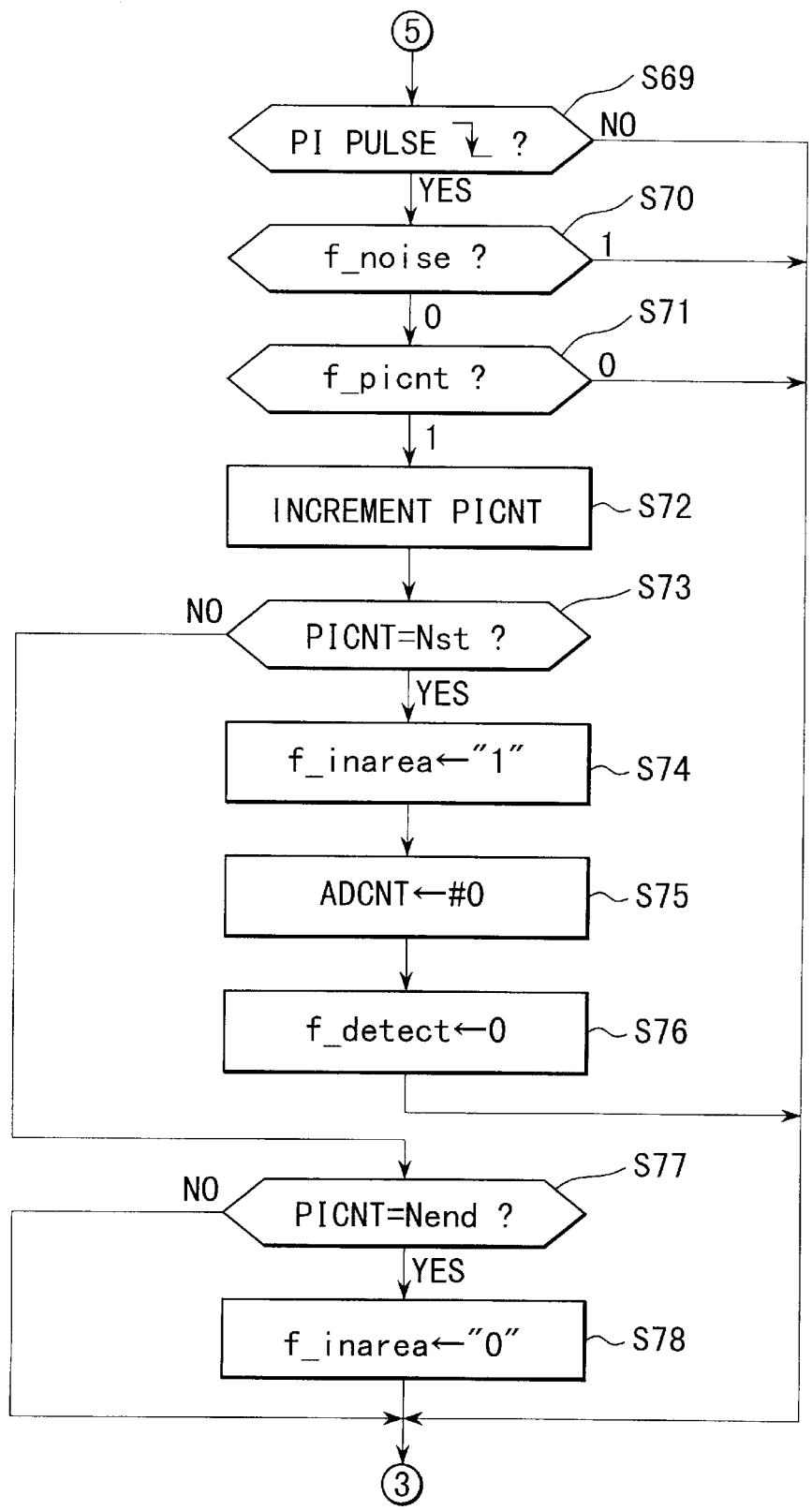
Figure 9:
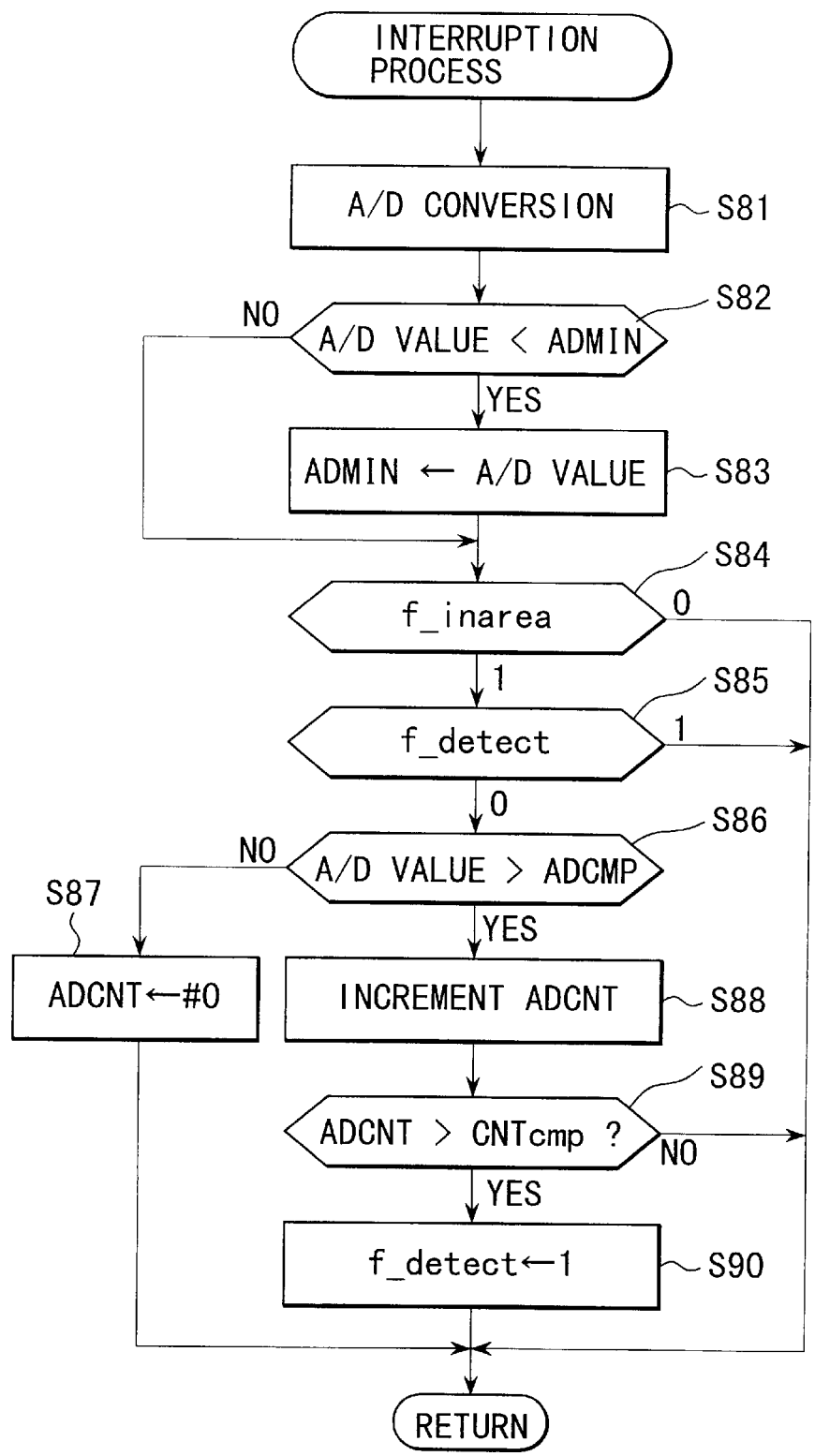
FIG. 9 is a flowchart for illustrating the operation of the subroutine "interruption process"
Figures 10A, 10B:
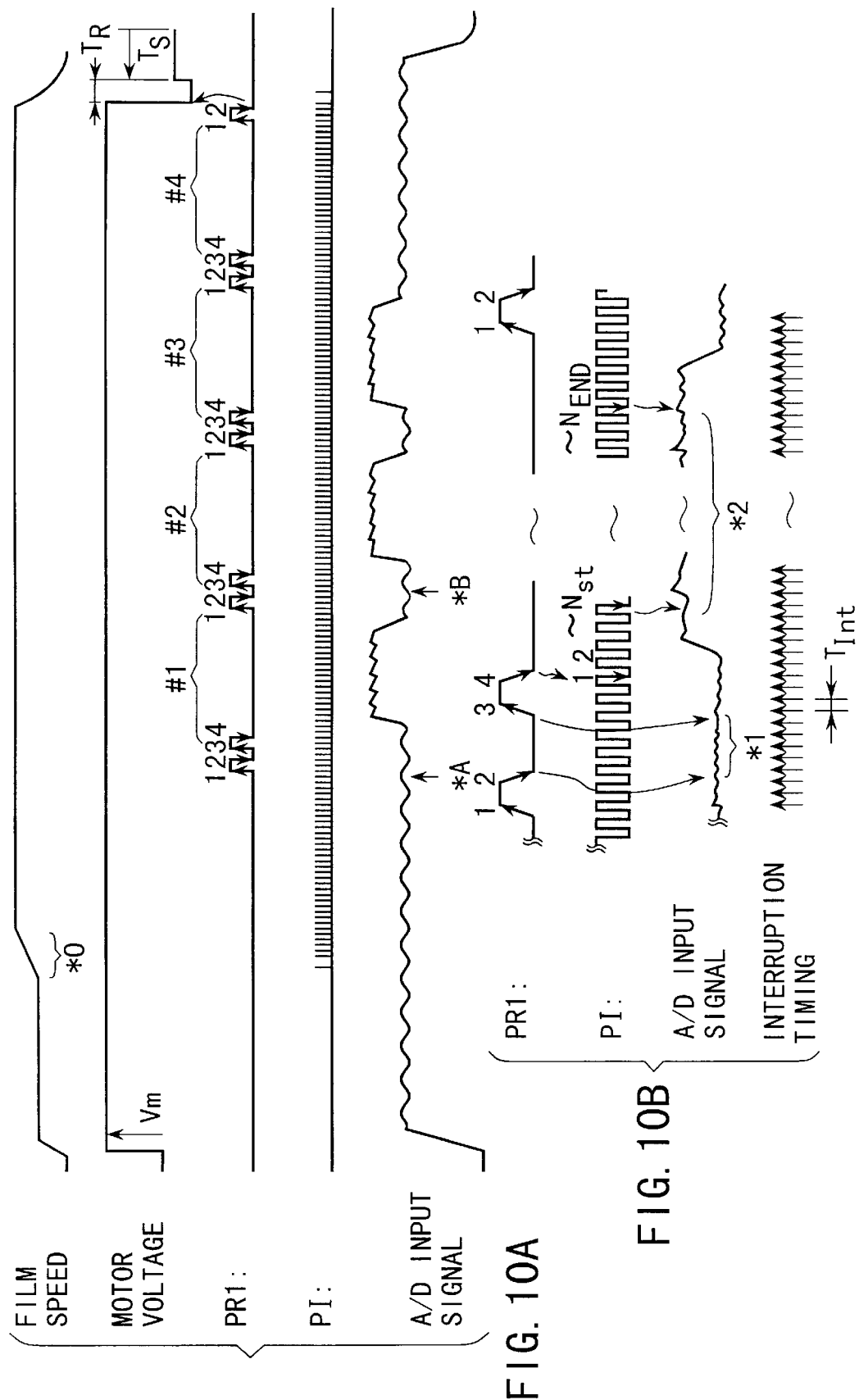
FIGS. 10A and 10B are timing charts for illustrating the operation of the subroutine "unexposed frame detection"

Next, the detail operation of the subroutine "unexposed frame detection" is explained with reference to FIGS. 8A to 8C. The interruption processing routine shown in FIG. 9 is effected in parallel to the operation of the subroutine "unexposed frame detection". FIGS. 10A and 10B are timing charts for illustrating the operation of the subroutine "unexposed frame detection".

When the subroutine "unexposed frame detection" is executed, the film 12 is fed out from the film cartridge 10 and wound around the spool 68. The film 12 is further wound from the frame number 1 in order, magnetic data is reproduced during the winding operation and the film winding operation is effected until an unexposed frame (a frame having no magnetic data) is detected.

The outline of the operation of the subroutine has been described above.

Next, the actual operation of the subroutine "unexposed frame detection" is explained.

First, in the step S41, the voltage of the output port P_CIREN of the microcomputer 40 is set from High to Low. By this operation, the reproducing circuit 58b is set into the operable state. Then, in the step S42, parameters necessary for the operation of the subroutine are read out.

Next, in the step S43, registers and control flags are initialized. In this case, PR1CNT is a register for counting a change in the signal of the photo-reflector 70. PICNT is a register for counting a pulse signal output from the photo-interrupter 74. The registers are cleared in the step S43.

Further, f_detect is a control flag which is cleared (←0) when the unexposed frame (the frame having no magnetic information) is detected. f_noise is a control flag which is set (←1) when an electromagnetic noise is superposed on the output of the reproducing circuit 58b and it is determined that magnetic information cannot be detected.

Further, f_picnt is a control flag which is set (←1) when a pulse signal output from the photo-interrupter 74 is to be counted and it is set only in a portion from the number 4 to the number 1 indicating a signal change of the photo-reflector 70 on the timing charts of FIGS. 10A, 10B. Further, f_inarea is a control flag which is set (←1) when the film 12 faces the magnetic head 14 in a position on the film in which the presence or absence of magnetic information can be determined. The flags are initialized in the step S43.

Next, in the step S44, an application voltage (Vm) of the film feeding motor 64 is set. The value of Vm is read out from the EEPROM 52 in the step S42. Then, the film feeding motor 64 is activated or turned ON in the step S45 and the winding operation of the film 12 is started.

In the step S46, $T_{int}$ is set in the timer counter and the time counting operation of the timer counter is started in the step S47. The timer counter issues an interruption signal at preset time intervals ($T_{int}$). If the interruption signal is generated, the process now effected by the microcomputer 40 is interrupted and the interruption process shown in FIG. 9 is effected.

If the interruption process routine is executed, an output of the reproducing circuit 58b is first A/D converted by the A/D converter 40a in the step S81. Next, in the step S82, data in a register ADMIN is compared with A/D converted conversion data. If the new A/D conversion value is smaller than the value of ADMIN, the new A/D conversion value is stored into ADMIN in the next step S83.

If it is detected in the step S82 that the A/D conversion value is larger than the value of ADMIN, data of ADMIN is not changed. Therefore, by the processes in the steps S82 and S83, a MIN value can be detected from a plurality of A/D conversion values. The processes are used for detecting a MIN value of the reproduction signal in an area indicated by *1 on the timing chart of FIG. 10B.

In the step S84, the state of the flag f_inarea is determined. If the flag is "0", the process is returned from the interruption process. On the other hand, if the flag is "1", it indicates that an area indicated by *2 on the timing chart of FIG. 10B is reproduced. The area indicated by *2 has magnetic information recorded thereon if the frame is an exposed frame. Therefore, it is necessary to determine the presence or absence of magnetic information.

Next, the step S85 is effected to determine the state of the control flag f_detect. The flag f_detect is a flag which is set (←11) when it is determined that magnetic information is present. Once the flag is set, the process of the steps S86 to S90 (determination of the presence or absence of magnetic information) is not effected in order to determine the state.

If it is determined in the step S85 that the flag f_detect is "0", the step S86 is effected to compare the A/D conversion value input in the step S81 with a value of ADCMP. A determination value created based on the MIN value of the reproduction signal of an area indicated by *1 on the timing chart of FIG. 10B is stored in the register ADCMP.

If the A/D conversion value is larger than the value of ADCMP, the step S88 is effected to increment a value of ADCNT. The value of ADCNT indicates the number of times by which an A/D conversion value larger than the determination value (ADCMP) is successively detected. In order to detect the number of successively detected times, the process is changed from the step S86 to the step S87 to clear ADCNT (←#0) when the A/D conversion value is smaller than the value of ADCMP.

After the value of ADCNT is incremented in the step S86, the value of ADCNT is compared with $CNT_{cmp}$ in the step S89. If the value of ADCNT is larger than $CNT_{cmp}$, the step S90 is effected to set the control flag f_detect. That is, it is determined that magnetic data is present in the frame now reproduced.

The control flag f_detect is cleared in the step S78 which will be described later. If the control flag f_detect is not set during the reproduction of the area of *2 on the timing chart of FIG. 10B, the control flag f_detect is determined at "0" and it is determined that no magnetic information is present. This indicates that the unexposed frame is detected.

It is necessary to determine $CNT_{cmp}$ by taking the set value of $T_{int}$, the amount of magnetic data, the winding speed of the film and the like into consideration. The value of $CNT_{cmp}$ is stored in the EEPROM 52. The value of $CNT_{cmp}$ is read out from the EEPROM 52 in the step S42.

Now, the explanation for the flowcharts of FIGS. 8A to 8C is made again.

It is necessary to determine $T_{int}$ by taking the A/D conversion time of the microcomputer 40, the recording density of magnetic data, the winding speed of the film and the like into consideration. The value of $T_{int}$ is stored in the EEPROM 54. The value of $T_{int}$ is read out from the EEPROM 54 in the step S42.

As already explained with reference to FIG. 3, the winding speed of the film 12 by the spool 68 is higher than the feeding-out speed of the film 12 by the rewinding shaft 92. Therefore, the film speed immediately after the film feeding motor 64 is turned ON is low and it becomes higher when the film 12 is wound around the spool 68.

This phenomenon is shown by a variation in the speed indicated by *0 on the timing chart of FIG. 10A.

When the film 12 is further fed out, the disk 78 is rotated and a pulse signal is generated from the photo-sensor 80. The pulse signal from the photo-interrupter 74 is detected in the step S69 which will be described later.

When the film 12 is further moved, the perforation passes in front of the photo-reflector 70 to change the output thereof as shown in FIG. 6. A change in the output of the photo-reflector 70 is detected in the step S48.

In the step S48, whether a change in the output of the photo-reflector 70 occurs or not is determined. If no change in the output is detected, the step S69 which will be described later is effected and if the change is detected, the step S49 is effected.

In the step S49, the value of PR1CNT is incremented. Then, in the step S50, whether the value of PR1CNT is "#1" or not is determined. If the value of PR1CNT is "#1", the step S51 is effected to reset the control flag f_picnt. After this, the step S69 is effected.

As already explained, f_picnt is set only in a portion from the number 4 to the number 1 indicating a change in the output of the photo-reflector on the timing chart. That is, when the control flag f_picnt is "1", it is determined that the magnetic head 14 lies in the range of Δ3 of FIG. 6. The magnetic head 14 lies outside the range of Δ3 until the value of PR1CNT changes from "1" to "4". Therefore, the flag is reset in the step S51. This is clearly understood from the positional relation between the photo-reflector 70 and the magnetic head 14 shown in FIG. 6 and the number of a change of the output of the photo-reflector 70 on the timing charts of FIGS. 10A, 10B.

In FIG. 10A, the numbers "1", "2", "3", "4" are described with respect to changes in the output of the photo-reflector 70 and the numbers are set to coincide with the values of PR1CNT. The control flag f_detect is set (←"1") when the value of PR1CNT is set to "#4" and the magnetic head 14 is set into the range of Δ3. This operation is effected in the step S66 which will be described later.

If it is detected in the step S50 that the value of PR1CNT is not "#1", the step S52 is effected. In the step S52, whether the value of PR1CNT is "#2" or not is determined. If the value of PR1CNT is "#2", the step S53 is effected. Then, the register ADMIN is initialized (←#FFn) in the step S53. This operation is required to detect the MIN value (the MIN value in the A/D conversion values) of signal levels output from the reproducing circuit 58b when the magnetic head 14 lies outside the range of Δ3.

If it is detected in the step S52 that the value of PR1CNT is "#2", the film 12 is wound to a position in which the photographing frame substantially faces the aperture 140. Therefore, in the next step S54, the value of FLMCNT is incremented. If the film feeding motor 64 is braked at the timing at which the value of PR1CNT is set to "#2", the film 12 is overrun by an amount of Δ1 shown in FIG. 6 and then stopped. Whether the film 12 is stopped or not is determined by the two operation steps S55 and S56.

In the step S55, the state of the control flag f_noise is determined. The flag f_noise is set when the reproduction signal contains a large amount of noise signals and the operation for determining whether magnetic information is present or not cannot be effected. Therefore, if the flag f_noise is "1", the step S57 is effected and if the flag is "0", the step S56 is effected.

In the step S56, the state of the flag f_detect is determined. If the control flag f_detect is "1", the operation must be continuously effected. Therefore, the step S69 is effected. On the other hand, if it is determined in the step S55 that the control flag is "0", it is determined that the unexposed frame is detected. Then, the step S57 is effected.

In the step S57, an application voltage to the motor 64 is inverted and kept for a preset period of time $(T_R)$. Then, a short brake is applied to the motor 64 for a preset period of time $(T_S)$ in the step S58. The film 12 is stopped by the operations of the steps S57 and S58.

Next, in the step S59, the operation of the timer counter is interrupted. As a result, the interruption process routine shown in FIG. 9 will not be executed.

Further, in the step S60, the voltage of the output port P_CIREN is set from Low to High to interrupt the operation of the reproducing circuit 58b. After this, the process is returned to the main routine.

If it is determined in the step S52 that the value of PR1CNT is not "#2", the step S61 is effected to determine whether the value of PR1CNT is "#3" or not. If the value of PR1CNT is equal to "#3", the step S62 is effected.

In the step S62, a value of $AD_{offset}$ is added to the value of ADMIN and the result of addition is stored into the register ADCMP. The value of ADMIN is initialized (step S53) when the value of PR1CNT has reached "#2". As already explained, the MIN value of the A/D conversion values is stored into ADMIN by the operations of the steps S82 and S83 in the flowchart of the interruption process.

Therefore, the value indicated by ADMIN indicates the MIN value of the output signals of the reproducing circuit in the range indicated by *1 on the timing chart of FIG. 10B. Then, a determination value used for determining whether magnetic information is present or not by using the value of ADMIN as a reference value is determined in the step S62.

It is necessary to determine the value of $AD_{offset}$ by taking a variation in the noise level output from the reproducing circuit 58b, a variation in the reproduction signal level output from the reproducing circuit 58b during the reproduction of magnetic information and the like into consideration. Therefore, the value of $AD_{offset}$ is stored in the EEPROM 52. The value of $AD_{offset}$ is read out from the EEPROM 52 in the step S42.

The MIN value can be detected when the magnetic head 14 lies outside the range of Δ3. Therefore, it can be detected while the value of PR1CNT lies between #1 and #4. However, it is desirable to detect the MIN value when the magnetic head 14 lies outside the recording area without fail. In order to serve the purpose, in this subroutine, the MIN value of the reproducing circuit is detected when the value of PR1CNT lies between #2 and #3.

In the step S63, whether the operation for determining the presence or absence of magnetic information can be effected or not is determined based on the MIN value stored in ADMIN. If the value of ADMIN is larger than the determination value $AD_{noise}$, the step S64 is effected to set the control flag f_noise (←1). If the flag is set, the operation for detecting the unexposed frame must be interrupted.

For this purpose, whether the operation is continued or interrupted is determined based on the state of the flag f_noise in the step S55 described before.

Since it is necessary to determine the determination value $AD_{noise}$ by taking the variation width of the noise level output from the reproducing circuit 58b into consideration, it is stored in the EEPROM 54.

Since the determination value $AD_{noise}$ is stored in the EEPROM 54, it is possible to write the determination value $AD_{noise}$ as one of the adjustment data items after evaluating the noise level of the actual product in the final stage of the manufacturing process of the camera and more precisely make the noise determination.

Further, if it is determined in the step S61 that the value of PR1CNT is not "#3", the step S65 is effected to determine whether the value of PR1CNT is "#4" or not. If it is not "#4", the step S69 is effected and if it is "#4", the step S66 is effected.

In the step S66, the control flag f_picnt is set (←1). As is clearly understood from the timing chart of FIG. 10A, it is determined that the magnetic head 14 is brought into the range of Δ3 of FIG. 6 when the value of PR1CNT has reached "#4". If the flag f_picnt is set, the operation for counting the pulse number of the photo-interrupter 74 is permitted. The magnetic head 14 lies in the range of Δ3 until the signal of the photo-reflector 70 next changes.

In the step S67, the register PICNT is cleared. The register PICNT is used for counting the number of pulses generated from the photo-interrupter 74.

PICNT is cleared when the value of PR1CNT has reached "#4", thereby indicating the position of the magnetic head 14 lying in the range of Δ3.

Next, in the step S68, PR1CNT is cleared (←#0). Therefore, the magnetic head 14 departs from the range of Δ3 when the value of PR1CNT has reached "#1". At this time, the control flag f_picnt must be reset. This operation corresponds to the step S51.

In the step S69, whether a pulse signal from the photo-interrupter 74 is input or not is determined. If the pulse signal is detected, the step S70 is effected and if no pulse signal is detected, the step S48 is effected.

In the step S70, the state of the control flag f_noise is determined. If the flag is "1", the unexposed frame detecting operation cannot be effected as described before. Therefore, since the process after the step S71 which will be described later becomes unnecessary, the step S48 is effected. On the other hand, if the flag is "0", the step S71 is effected to determine the state of the flag f_picnt.

If the flag f_picnt is "0", it is determined that the magnetic head 14 does not lie in the range of Δ3 of FIG. 6. Therefore, since it is not necessary to count the pulse signal, the step S48 is effected. If it is determined in the step S71 that the flag is "1", the step S72 is effected to increment the value of PICNT.

Next, in the step S73, whether the value of PICNT is equal to Nst or not is determined. If the value of PICNT is equal to Nst, it is determined that the operation for determining the presence or absence of magnetic data can be effected. Therefore, the flag f_inarea is set in the step S74. If the flag is set, the operation for determining the presence or absence of magnetic data is effected in the "interruption process" described before.

Prior to the start of the determining operation, ADCNT is cleared in the step S75 and the flag f_detect is reset in the next step S76.

If it is determined in the step S73 that the value of PICNT is not equal to Nst, the step S77 is effected to determine whether or not the value of PICNT is equal to Nend. Then, if it is determined in the step S77 that the value of PICNT is equal to Nend, the step S78 is effected to reset the flag f_inarea. If the flag f_inarea is reset, the operation for determining the presence or absence of magnetic data in the "interruption process" is inhibited.

The process of the steps S73 to S78 is to effect the determination operation only in the range indicated by *2 on the timing chart of FIG. 10B. By changing the values of Nst and Nend, the determination operation can be effected even if magnetic information is recorded in any position of the range of Δ3. Nst and Nend are parameters stored in the EEPROM 54.

Figure 11:
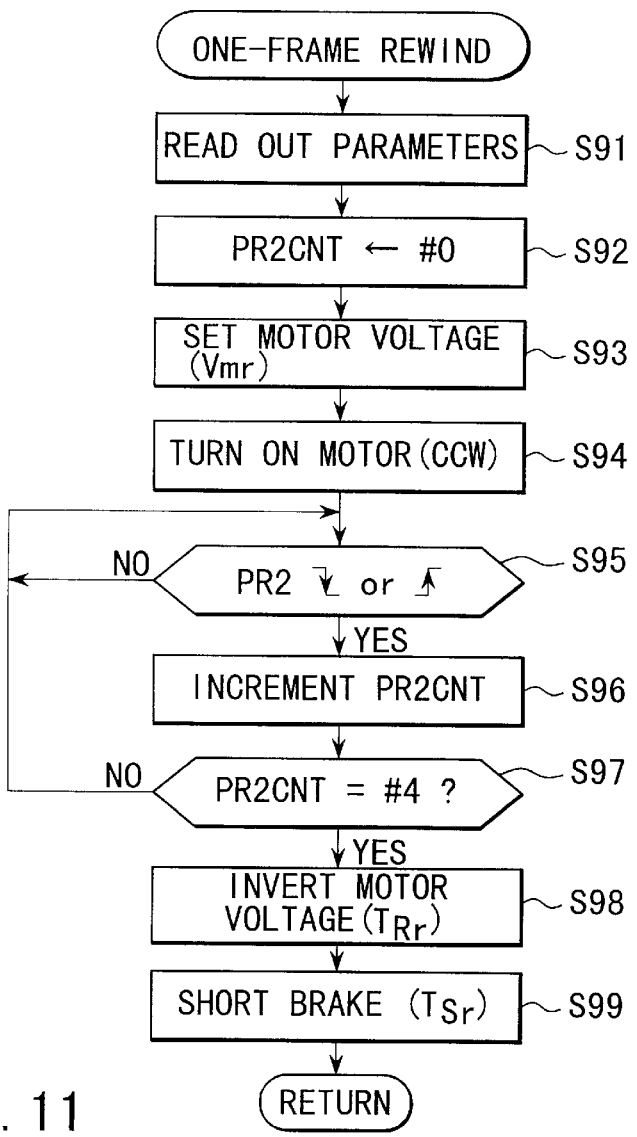
FIG. 11 is a flowchart for illustrating the operation of the subroutine "one-frame rewind"
Figure 12:
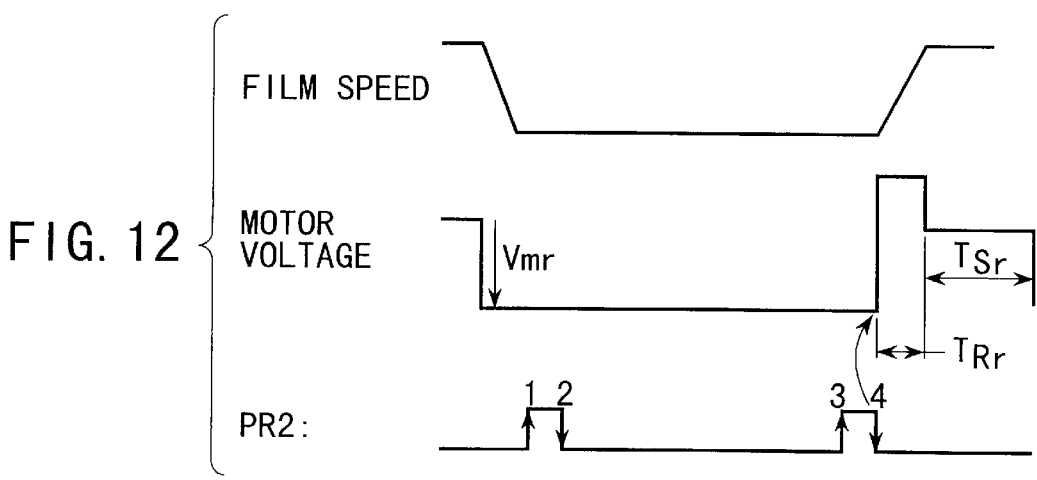
FIG. 12 is a timing chart for illustrating the operation of the subroutine "one-frame rewind"

FIG. 11 is a flowchart for illustrating the operation of the subroutine "one-frame rewind", and FIG. 12 is a timing chart for illustrating the operation of the subroutine "one-frame rewind".

Next, the operation of the subroutine "one-frame rewind" is explained with reference to FIGS. 11 and 12.

First, in the step S91, control parameters are read out from the EEPROM 54. Then, in the step S92, a register PR2CNT is cleared (←#0). The register PR2CNT is used for counting a change in the output signal of the photo-reflector 72.

Next, in the step S93, a voltage (Vmr) applied to the film feeding motor 64 is set. Then, in the step S94, the motor 64 is turned ON. As a result, the film 12 is moved in a rewinding direction.

At this time, in the step S95, whether a change in the output from the photo-reflector 72 is made or not is determined. If the change is detected, the step S96 is effected and the value of PR2CNT is incremented (+1). Then, in the step S97, whether the value of PR2CNT reaches "#4" or not is determined.

If it is determined in the step S97 that the value of PR2CNT is not "#4", the step S95 is effected to continuously rewind the film 12. On the other hand, if it is determined in the step S97 that the value of PR2CNT is "#4", it is determined that the film 12 is rewound by approximately one frame.

Then, in the step S98, the application voltage to the motor is inverted and kept for a preset period of time ($T_{Rr}$). Further, in the step S99, a short brake is applied to the motor 64 for a preset period of time ($T_{Sr}$). By the two operations, the film 12 is overrun by an amount of Δ2 of FIG. 6 and then stopped.

Next, a third embodiment of this invention is explained.

The envelope signal output from the reproducing circuit 58b in the second embodiment is output to the positive (+) direction with respect to the bias voltage. However, it is possible to output the envelope signal in the negative (−) direction with respect to the bias signal by slightly changing the circuit construction.

Figure 13:
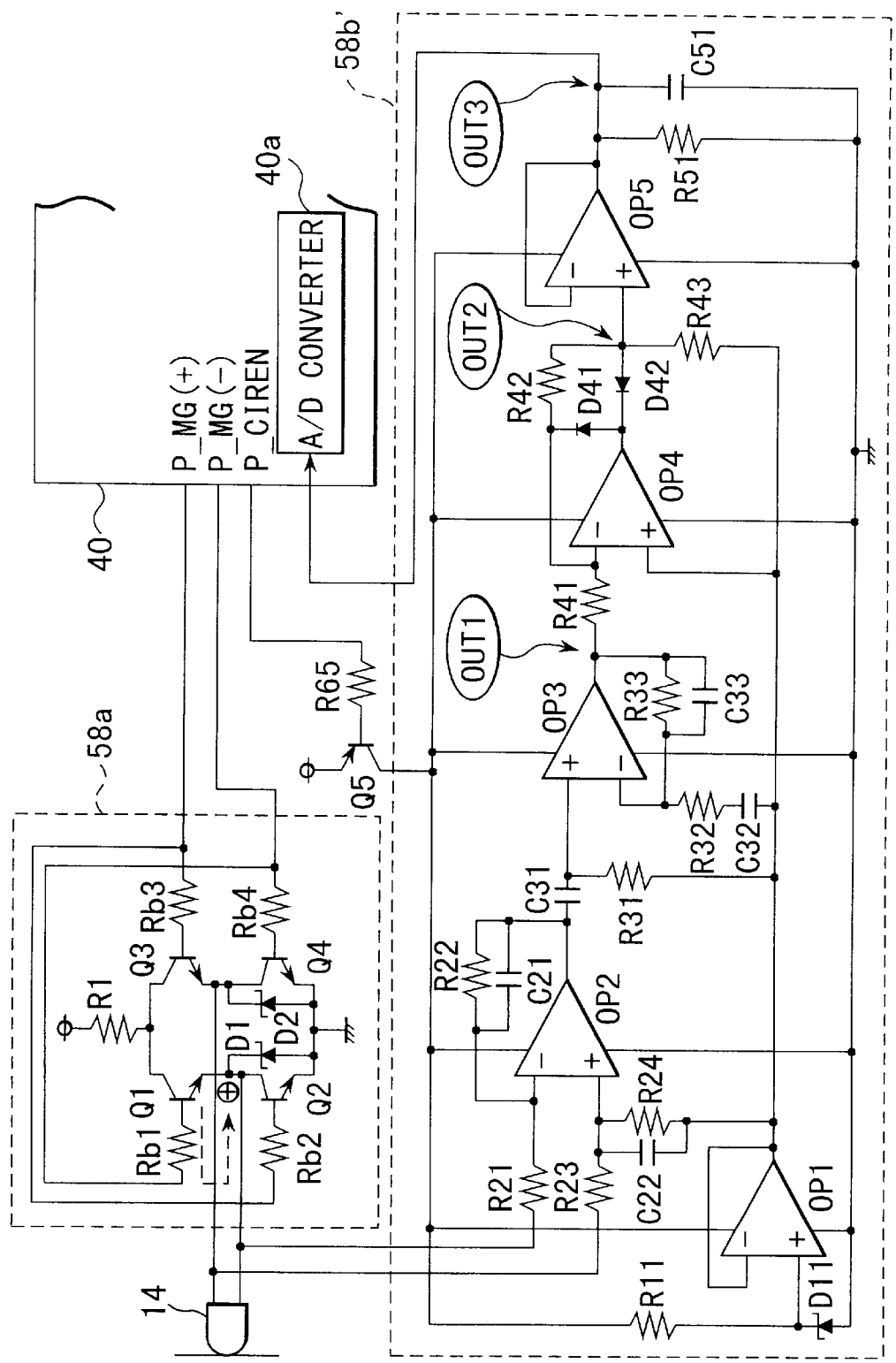
FIG. 13 is a diagram showing a detail circuit construction of a recording/reproducing circuit 58 and a peripheral circuit thereof according to a third embodiment of this invention.

FIG. 13 is a diagram showing a detail circuit construction of a recording/reproducing circuit 58' and a peripheral circuit thereof according to the third embodiment of this invention in which the circuit construction is changed.

The circuit of FIG. 13 is similar to that of FIG. 4 except that the direction of the diode necessary for half-wave rectification of the reproduction signal is reversed.

That is, the directions of the polarities of Schottky barrier diodes D'41 and D42 in FIG. 13 are opposite to those of the diodes D41 and D42 in the circuit of FIG. 4. Since the circuit is similar to that of FIG. 4 except that the directions of the diodes are reversed and the operation of the circuit is the same as that of FIG. 4, the explanation thereof is omitted.

FIGS. 14A to 14D are diagrams showing signals in various portions (OUT1, OUT2, OUT3) when a reproducing circuit 58b' of FIG. 13 is operated.

FIG. 14A shows the magnetized state of a film and it is assumed that "0", "1", "0", "1" are recorded in the recording area.

FIG. 14B is a timing chart for illustrating the operation of a signal of the output OUT1 of the non-inverting amplifier shown in FIG. 13. An output of the magnetic head 14 is amplified and appears on the output OUT1. An output of the magnetic head 14 is amplified with the bias voltage (Vbias) output from the operational amplifier OP1 used as a reference. When the recording area of the film is moved in contact with the magnetic head 14, a reproduction signal corresponding to the magnetized state of the film appears on the output OUT1. When the magnetic head 14 does not lie on the recording area, a noise signal mainly generated by the amplifier appears on the output OUT1.

FIG. 14C is a timing chart for illustrating the operation of a signal of the output OUT2 of the half-wave rectifier circuit shown in FIG. 13. Only a signal portion larger than Vbias of the output OUT1 is inverted with Vbias used as a reference by the half-wave rectifier circuit and appears on the output OUT2 of the half-wave rectifier circuit.

FIG. 14D is a timing chart for illustrating the operation of a signal of the output OUT3 of the voltage follower of FIG. 13. The envelope signal of a signal of the output OUT2 appears on the output OUT3. Since the envelope signal is output on the negative (−) side with respect to Vbias, it is necessary to change the operation of the microcomputer. In order to cope with the thus changed circuit, it is necessary to change the subroutine "unexposed frame detection" shown in FIGS. 8A to 8C and the interruption process routine of FIG. 9.

Figure 15A:
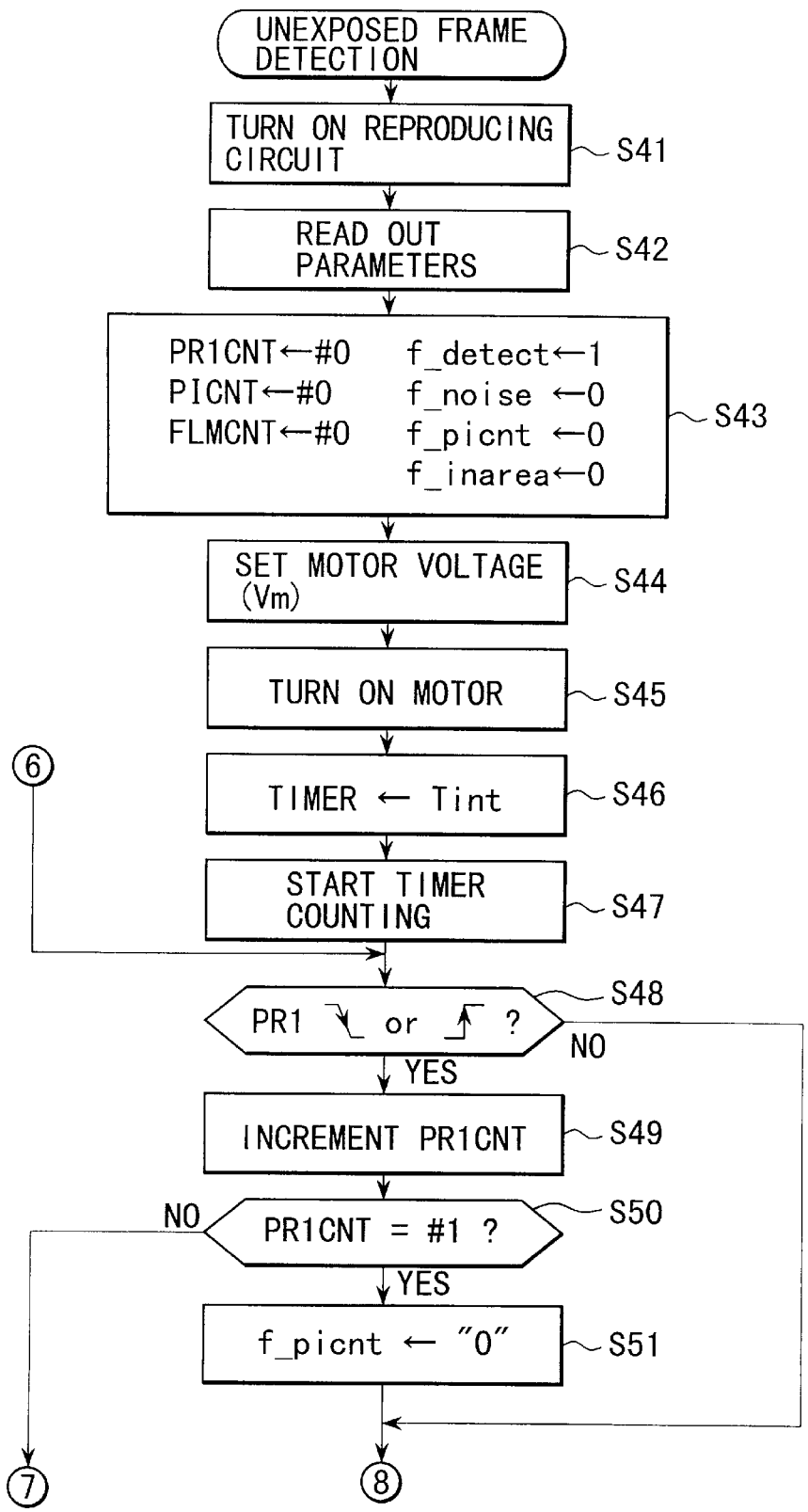
FIGS. 15A to 15C are flowcharts for illustrating the detail operation of the subroutine "unexposed frame detection" in the third embodiment of this invention.
Figure 15B:
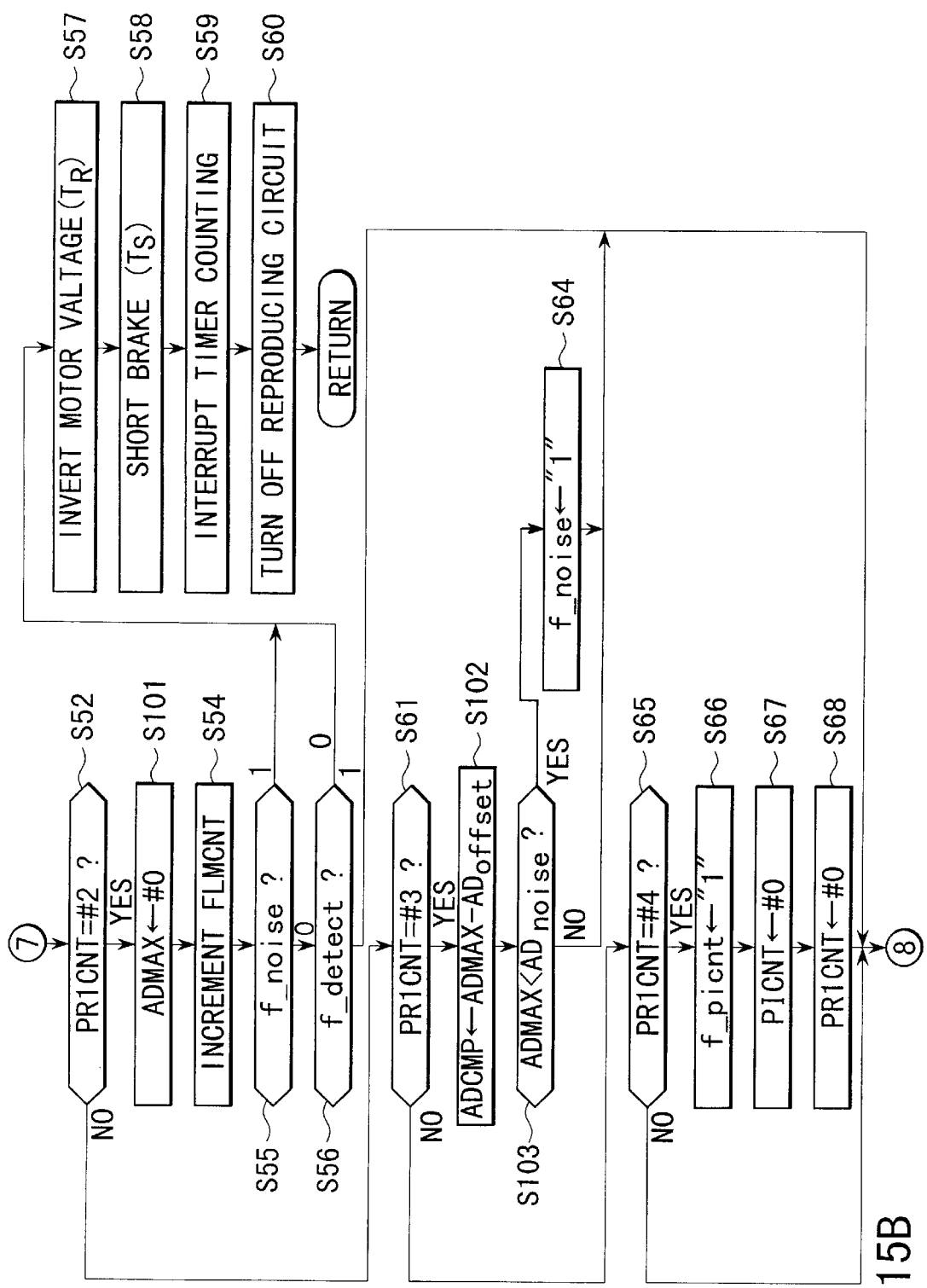
Figure 15C:
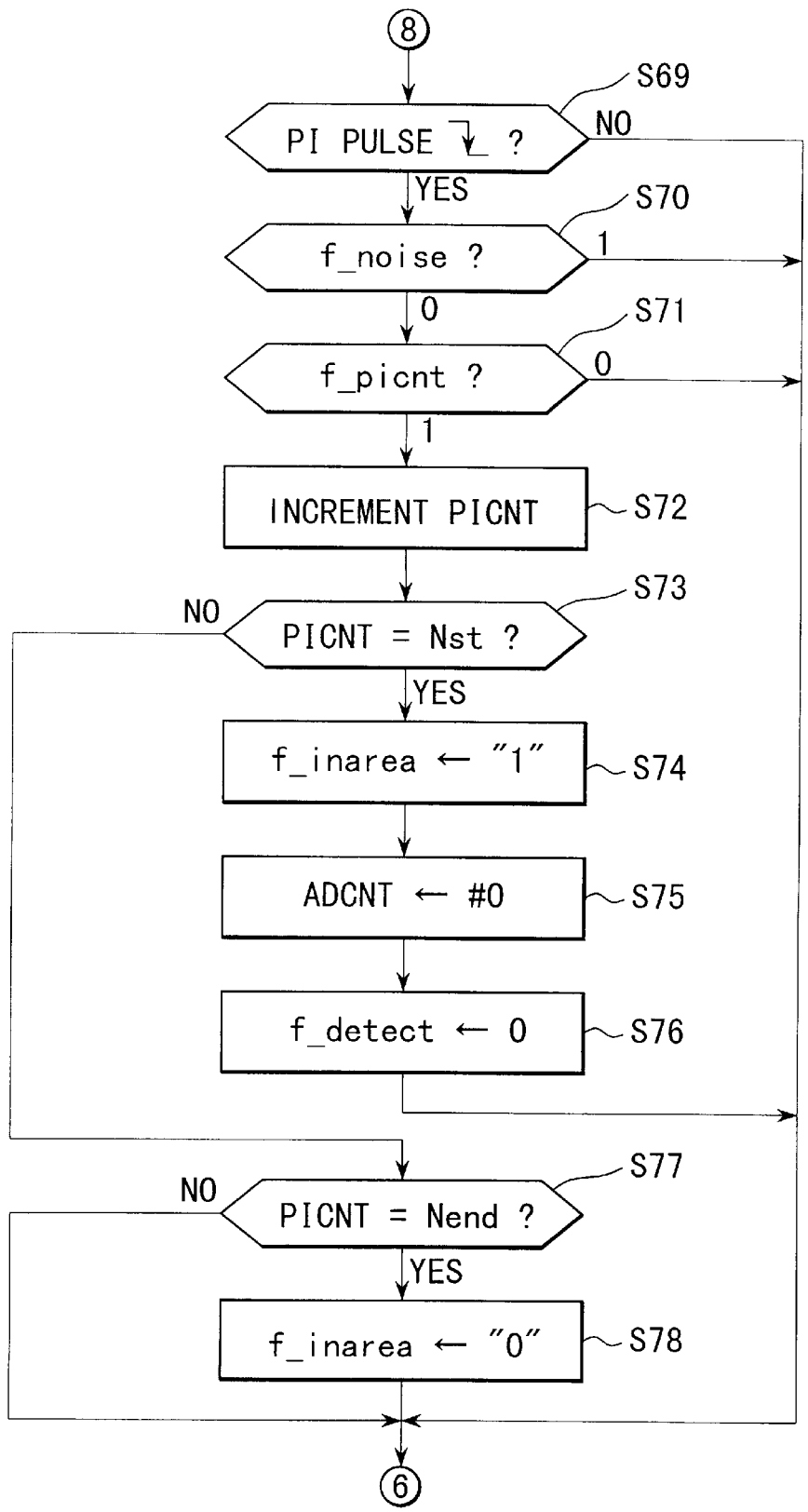
Figure 16:
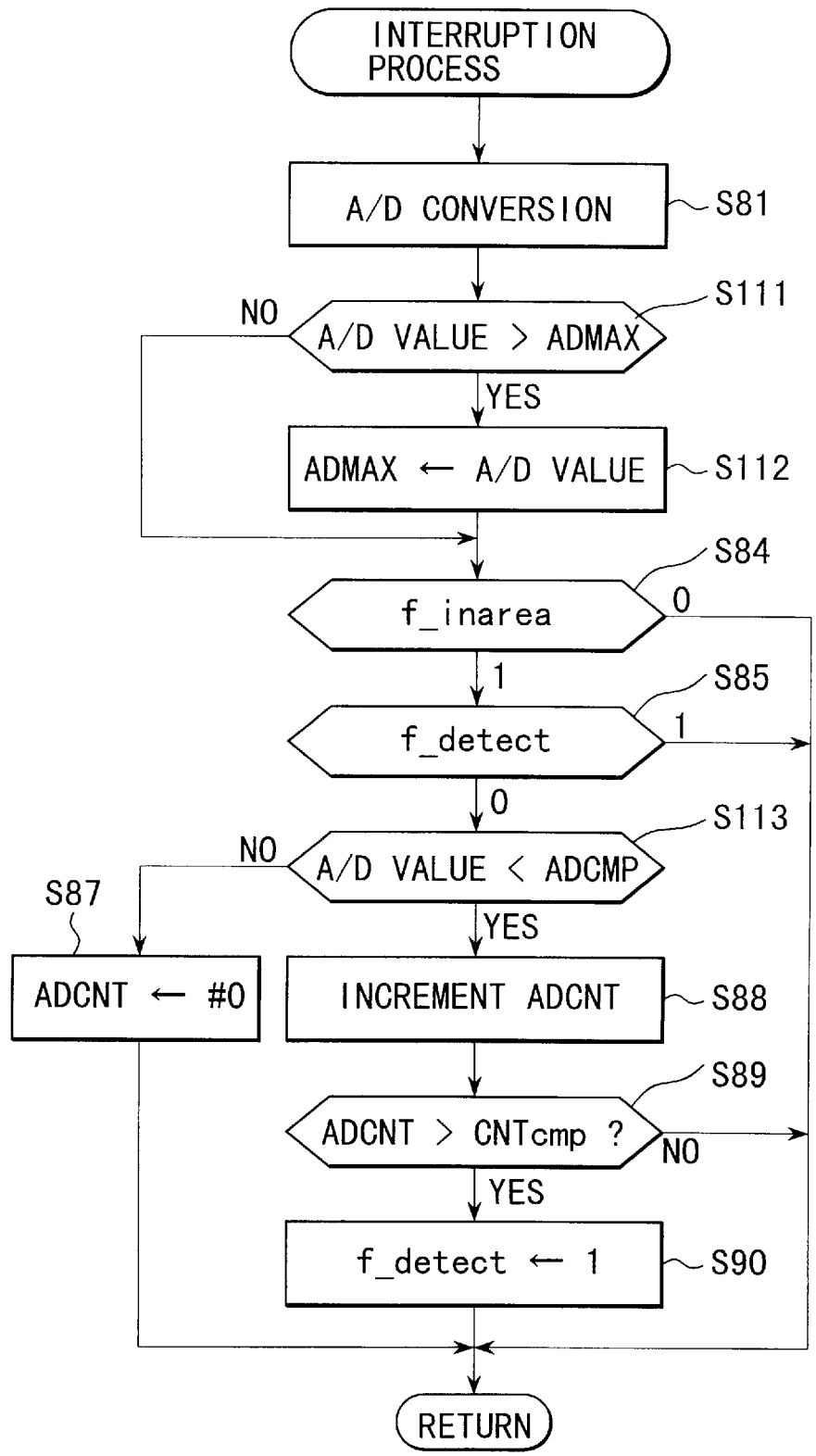
FIG. 16 is a flowchart for illustrating the operation of the subroutine "interruption process" in the third embodiment of this invention.

FIGS. 15A to 15C show the changed subroutine "unexposed frame detection". FIG. 16 shows, the changed interruption process subroutine. FIGS. 17A and 17B are timing charts corresponding to the changed subroutines.

No significant difference lies in the operation of the microcomputer between the second embodiment described above and the third embodiment.

In the flowcharts of FIGS. 15A to 15C and FIG. 16, since the steps are the same as those in the flowcharts of FIGS. 8A to 8C and FIG. 9 except the steps S101, S102, S103, S111, S112 and S113, the operation of the microcomputer only for the changed processing steps is explained, the same reference numerals are attached to the other processing steps and the explanation therefor is omitted.

In the third embodiment, a MAX value of the A/D conversion values is derived in the recording area indicated by *1 on the timing chart of FIG. 17B. The envelope signal is output on the negative (−) side with respect to Vbias. Therefore, the MAX value indicates the MIN value of the reproduction signal. A determination value necessary for determining the presence or absence of magnetic information is determined in the same manner as in the second embodiment.

A MAX value of a plurality of A/D conversion values is stored into a register ADMAX by the two changed processing steps S111 and S112 in the "interruption process" routine of FIG. 16.

In order to derive the MAX value in the recording area indicated by *1 on the timing chart of FIG. 17B, it is necessary to initialize ADMAX at the time of detection of a second signal change of PR1 on the timing chart. Initialization (←#0 h) of ADMAX is effected in the step S101 of the subroutine "unexposed frame detection" of FIGS. 15A to 15C.

When a third signal change of PR1 is detected on the timing chart, a determination value is determined based on the MAX value stored in ADMAX. The operation is effected in the step S102.

In the step S102, a value of $AD_{offset}$ is subtracted from the value of ADMAX and the result of subtraction is stored into the register ADCMP. In the step S53 (FIG. 8B) of the second embodiment corresponding to the step S102, the result of addition of a value of $AD_{offset}$ to the value of ADMIN is used as a determination value.

However, an output of the reproducing circuit of the second embodiment takes a form which is obtained by inverting the output of the reproducing circuit of the first embodiment with Vbias used as a reference. Therefore, the result of subtraction of the value of $AD_{offset}$ from the value of ADMAX is used as a determination value in the third embodiment.

In the step S103, whether or not the value of ADMAX is smaller than the value of $AD_{noise}$ is determined. If the value of ADMAX is smaller than the value of $AD_{noise}$, it is determined that the noise level output from the reproducing circuit is large and the unexposed frame detecting operation cannot be effected. In this case, the step S64 is effected to set the flag f_noise.

In the step S102, the presence or absence of magnetic information is determined by comparing the determination value stored in ADCMP with the level of the reproduction signal A/D converted in the area of *2 on the timing chart.

The operation for comparing the value of ADMAX with the A/D conversion value is effected in the step S113 in the flowchart of the interruption process of FIG. 16. The operation of the third embodiment corresponding to the step S113 is the step S86 of FIG. 9. Since the reproduction signal is output on the negative (−) side with respect to Vbias, the direction of the magnitude comparison symbol (<) in the step S113 is reversed with respect to that of the symbol in the step S86.

The steps S101, S102, S103, S111, S112, S113 as described above are the operations of the microcomputer different from that in the first embodiment. The other operations are the same as those of the first embodiment.

As described above, according to this invention, it is possible to provide a camera using a cartridge which can be replaced in the course of usage, for stably detecting a frame having magnetic data and a frame having no magnetic data and preventing at least occurrence of a frame of double exposure and an unexposed frame even if the S/N ratio of the reproduction signal is lowered by the electromagnetic noise and the presence of magnetic data cannot be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A film feeding device which, when a film cartridge including a partially exposed film is loaded, detects an unexposed frame while feeding the film, said device comprising:

film feeding means for feeding the film from the film cartridge, said film having magnetic recording portions each adjacent to a corresponding photographing frame in a longitudinal direction thereof and non-magnetic recording portions defined between the magnetic recording portions;

readout means having a magnetic head, for reading out data that is magnetically recorded on the film and outputting a reproduction signal;

position detecting means for detecting perforations of the film and determining whether the magnetic head is positioned on a magnetic recording portion or a non-magnetic recording portion;

setting means for setting a threshold value based on the reproduction signal output from the readout means when the position detecting means determines that the magnetic head is positioned on the non-magnetic recording portion;

frame determining means for comparing the reproduction signal output from the readout means with the threshold value when the position detecting means determines that the magnetic head is positioned on the magnetic recording portion and thereby determining whether a frame is exposed or unexposed; and noise detecting means for detecting a noise in the reproduction signal output from the readout means when the position detecting means determines that the magnetic head is positioned on the non-magnetic recording portion.

2. A device according to claim 1, further comprising:

noise determining means for determining whether or not a level of the noise detected by the noise detecting means exceeds a predetermined level; and control means for prohibiting the frame determining means from operating when the noise determining means determines that the level of the noise exceeds the predetermined level.

3. A device according to claim 2, wherein said control means causes the film feeding means to wind the film up into the film cartridge when the noise determining means determines that the level of the noise exceeds the predetermined level, as well as prohibiting the frame determining means from operating.

4. A device according to claim 1, wherein the reproduction signal output from the readout means is an envelope signal.

5. A film feeding device which, when a film including a partially exposed film is loaded, detects an unexposed frame while feeding the film, said device comprising:

a film feeding mechanism for feeding the film from the film cartridge, said film having magnetic recording portions each adjacent to a corresponding photographing frame in a longitudinal direction thereof and non-magnetic recording portions defined between the magnetic recording portions;

a reproducing circuit having a magnetic head that is set in contact with the magnetic recording portions and non-magnetic recording portions, for reading out data that is magnetically recorded on the film and outputting a reproduction signal;

a position detecting unit for detecting perforations of the film and determining whether the magnetic head is positioned on a magnetic recording portion or a non-magnetic recording portion;

a setting circuit for setting a threshold value based on the reproduction signal output from the reproducing circuit when the position detecting unit determines that the magnetic head is positioned on the non-magnetic recording portion;

a magnetic data detecting circuit for comparing the reproduction signal output from the reproducing circuit with the threshold value when the position detecting unit determines that the magnetic head is positioned on the magnetic recording portion and thereby determining whether a frame is exposed or unexposed; and a noise detecting circuit for detecting a noise in the reproduction signal output from the reproducing circuit when the position detecting unit determines that the magnetic head is positioned on the non-magnetic recording portion.

6. A device according to claim 5, further comprising:

a noise determining circuit for determining whether or not a level of the noise detected by the noise detecting circuit exceeds a predetermined level; and a control unit for prohibiting the magnetic data detecting circuit from operating when the noise determining circuit determines that the level of the noise exceeds the predetermined level.

7. A device according to claim 6, wherein said control unit causes the film feeding mechanism to wind the film up into the film cartridge when the noise determining circuit determines that the level of the noise exceeds the predetermined level, as well as prohibiting the magnetic data detecting circuit from operating.

8. A device according to claim 5, wherein the setting circuit detects one of a maximum value and a minimum value of the reproduction signal and sets the threshold value on the basis of the detected value.

9. A device according to claim 5, wherein the magnetic data detecting circuit compares the reproduction signal with the threshold value a plurality of times, and determines that magnetic data exists, when the reproduction signal exceeds the threshold value a predetermined number of times.

10. A device according to claim 6, wherein the noise determining circuit detects one of a maximum value and a minimum value of the level of the noise output from the noise detecting circuit and determines whether or not the detected value is outside a predetermined range of level.

11. A film reading device which, when a film cartridge including a partially exposed film is loaded, detects an unexposed frame while feeding the film, said device comprising:

film feeding means for feeding the film from the film cartridge, said film having magnetic recording portions each adjacent to a corresponding photographing frame in a longitudinal direction thereof and non-magnetic recording portions defined between the magnetic recording portions;

readout means having a magnetic head that is set in contact with a magnetic recording section of the film, for reading signals from a magnetic recording portion and a non-magnetic recording portion of the film and outputting a reproduction signal when the film feeding means is feeding the film;

position detecting means for detecting perforations of the film and determining whether the magnetic head is positioned on a magnetic recording portion or a non-magnetic recording portion;

setting means for setting a threshold value which is used for determining a no-signal level on the basis of the reproduction signal output from the readout means when the position detecting means determines that the magnetic head is positioned on the non-magnetic recording portion;

storing means for storing the threshold value;

frame determining means for comparing the reproduction signal output from the readout means with the threshold value stored in the storing means when the position detecting means determines that the magnetic head is positioned on the magnetic recording portion and thereby determining whether or not data is recorded in the magnetic recording portion;

noise level determining means for determining whether or not the reproduction signal output from the readout means exceeds a predetermined noise level value when the position detecting means determines that the magnetic head is positioned on the non-magnetic recording portion; and control means for allowing the frame determining means to operate when the noise level determining means determines that the reproduction signal is under the predetermined noise level value, and prohibiting the frame determining means from operating when the noise level determining means determines that the reproduction signal exceeds the predetermined noise level value.

12. A device according to claim 11, wherein the control means causes the film feeding means to wind the film up into the film cartridge, as well as prohibiting the frame determining means from operating, when the noise level determining means determines that the reproduction signal exceeds the predetermined noise level value.

13. A film reading device which, when a film cartridge including a partially exposed film is loaded, detects an unexposed frame while feeding the film, said device comprising:

film feeding means for feeding the film from the film cartridge, said film having magnetic recording portions each adjacent to a corresponding photographing frame in a longitudinal direction thereof and non-magnetic recording portions defined between the magnetic recording portions;

readout means having a magnetic head that is set in contact with a magnetic recording section of the film, for reading signals from a magnetic recording portion and a non-magnetic recording portion of the film and outputting a reproduction signal when the film feeding means is feeding the film;

position detecting means for detecting perforations of the film and determining whether the magnetic head is positioned on a magnetic recording portion or a non-magnetic recording portion; and noise level determining means for determining whether or not the reproduction signal output from the readout means exceeds a predetermined noise level value when the position detecting means determines that the magnetic head is positioned on the non-magnetic recording portion.

14. A film reading device which, when a film cartridge including a partially exposed film is loaded, detects an unexposed frame while feeding the film, said device comprising:

film feeding means for feeding the film from the film cartridge, said film having magnetic recording portions each adjacent to a corresponding photographing frame in a longitudinal direction thereof and non-magnetic recording portions defined between the magnetic recording portions;

readout means having a magnetic head, for reading out data that is magnetically recorded on the film and outputting a reproduction signal;

position detecting means for detecting perforations of the film and determining whether the magnetic head is positioned on the magnetic recording portion or the non-magnetic recording portion;

setting means for setting a threshold value based on the reproduction signal output from the readout means when the position detecting means determines that the magnetic head is positioned on the non-magnetic recording portion;

a non-volatile memory for storing a predetermined second threshold value in a writable manner;

frame determining means for comparing the reproduction signal output from the readout means with the first threshold value when the position detecting means determines that the magnetic head is positioned on the magnetic recording portion and thereby determining whether a frame is exposed or unexposed; and noise determining means for determining whether or not a noise exists by comparing the reproduction signal output from the readout means with the second threshold value when the position detecting means determines that the magnetic head is positioned on the non-magnetic recording portion.

* * * * *